United States Patent [19]

Adachi et al.

[11] Patent Number: 4,931,644
[45] Date of Patent: * Jun. 5, 1990

[54] METHOD OF ADJUSTING RADIATION IMAGE READ-OUT CONDITIONS

[75] Inventors: Yuuma Adachi; Nobuyoshi Nakajima; Masamitsu Ishida, all of Kanagawa, Japan

[73] Assignee: Fuji Photo Film Co., Ltd., Kanagawa, Japan

[*] Notice: The portion of the term of this patent subsequent to Jul. 25, 2006 has been disclaimed.

[21] Appl. No.: 164,654

[22] Filed: Mar. 7, 1988

Related U.S. Application Data

[63] Continuation of Ser. No. 760,862, Jul. 31, 1985.

[30] Foreign Application Priority Data

Jul. 31, 1984 [JP] Japan .................. 59-160355
Jul. 15, 1985 [JP] Japan .................. 60-155843
Jul. 15, 1985 [JP] Japan .................. 60-155844
Jul. 15, 1985 [JP] Japan .................. 60-155845
Jul. 15, 1985 [JP] Japan .................. 60-155846
Jul. 15, 1985 [JP] Japan .................. 60-155847
Jul. 15, 1985 [JP] Japan .................. 60-155848

[51] Int. Cl.$^5$ .............................................. G03G 5/16
[52] U.S. Cl. ............................. 250/327.2; 250/484.1
[58] Field of Search .................. 790/327.2, 484.1; 382/22, 48

[56] References Cited

U.S. PATENT DOCUMENTS

| | | | |
|---|---|---|---|
| 4,242,662 | 12/1980 | Ysujiyama | 382/22 |
| 4,519,041 | 5/1985 | Fant et al. | 382/22 |
| 4,568,832 | 2/1986 | Yanaka et al. | 250/327.2 |

Primary Examiner—Janice A. Howell
Assistant Examiner—Richard Hanig
Attorney, Agent, or Firm—Sughrue, Mion, Zinn, Macpeak & Seas

[57] ABSTRACT

In a method of adjusting read-out conditions for a radiation image stored on a stimulable phosphor sheet by limiting the radiation exposure field, digital image signals at respective positions on the stimulable phosphor sheet for detected on the basis of image information obtained by preliminary read-out. The digital image signals are subjected to a differentiation processing, and the radiation exposure field on the stimulable phosphor sheet is detected by use of the differentiated values obtained thereby. The read-out conditions in final read-out are adjusted on the basis of the image information obtained within the detected radiation exposure field by the preliminary read-out.

14 Claims, 12 Drawing Sheets

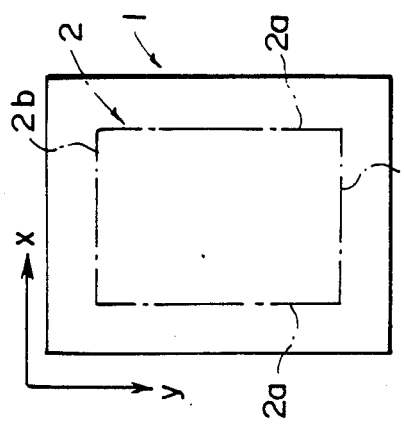

ORIGINAL IMAGE

MEDIAN FILTER PROCESSED IMAGE

FIG.7  FIG.8A  FIG.8B  FIG.8C  FIG.8D
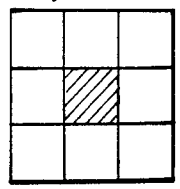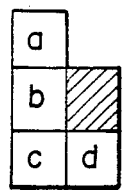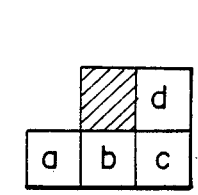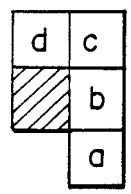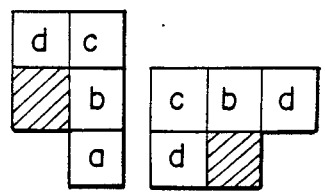
FIG.9A  FIG.9B  FIG.9C
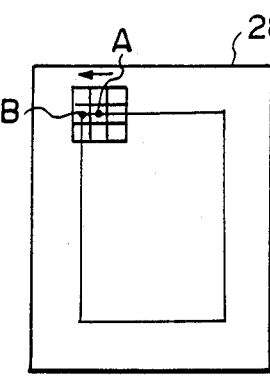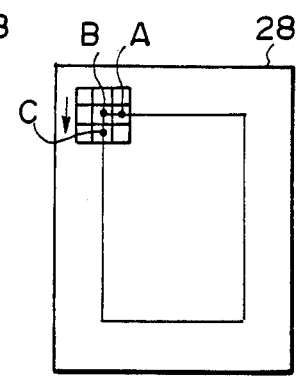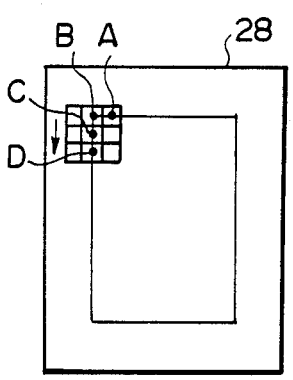
FIG.9D  FIG.9E
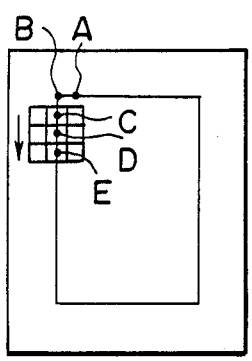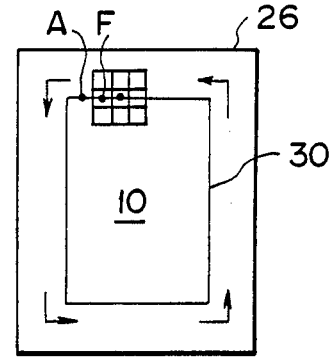

FIG.11
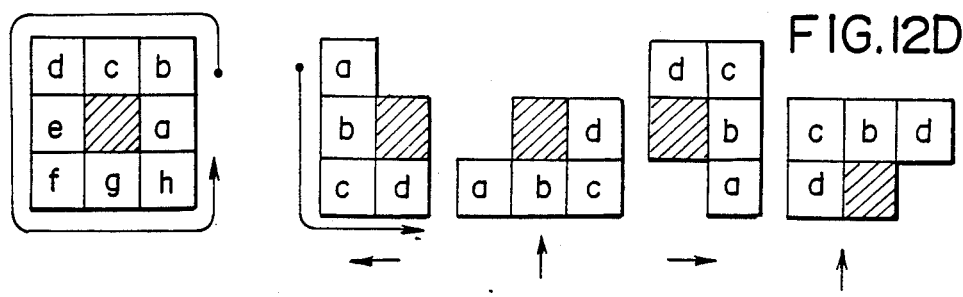
FIG.12A  FIG.12B  FIG.12C  FIG.12D
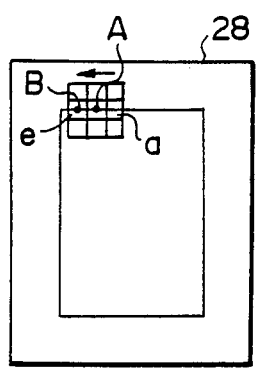
FIG.13A
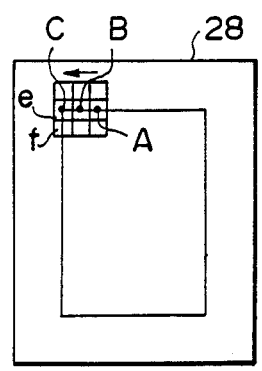
FIG.13B
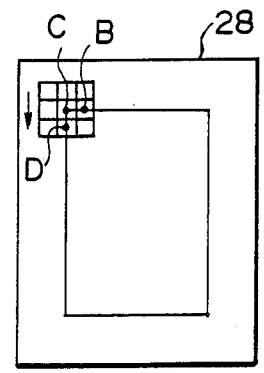
FIG.13C
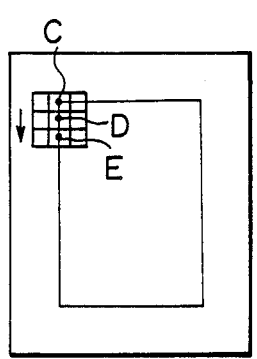
FIG.13D
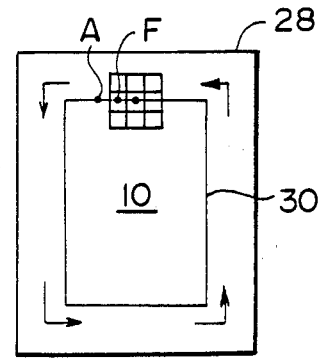
FIG.13E

FIG. 15

| f(1,1) | f(1,2) | f(1,3) | f(1,4) | f(1,5) |
|---|---|---|---|---|
| f(2,1) | f(2,2) | f(2,3) | f(2,4) | f(2,5) |
| f(3,1) | f(3,2) | f(3,3) | f(3,4) | f(3,5) |
| f(4,1) | f(4,2) | f(4,3) | f(4,4) | f(4,5) |
| f(5,1) | f(5,2) | f(5,3) | f(5,4) | f(5,5) |

FIG. 16A

| $\delta'_{(1,1)}$ | $\delta'_{(1,2)}$ | $\delta'_{(1,3)}$ | $\delta'_{(1,4)}$ |
|---|---|---|---|
| $\delta'_{(2,1)}$ | $\delta'_{(2,2)}$ | $\delta'_{(2,3)}$ | $\delta'_{(2,4)}$ |
| $\delta'_{(3,1)}$ | $\delta'_{(3,2)}$ | $\delta'_{(3,3)}$ | $\delta'_{(3,4)}$ |
| $\delta'_{(4,1)}$ | $\delta'_{(4,2)}$ | $\delta'_{(4,3)}$ | $\delta'_{(4,4)}$ |

FIG. 16B

| $\delta''_{(1,1)}$ | $\delta''_{(1,2)}$ | $\delta''_{(1,3)}$ | $\delta''_{(1,4)}$ |
|---|---|---|---|
| $\delta''_{(2,1)}$ | $\delta''_{(2,2)}$ | $\delta''_{(2,3)}$ | $\delta''_{(2,4)}$ |
| $\delta''_{(3,1)}$ | $\delta''_{(3,2)}$ | $\delta''_{(3,3)}$ | $\delta''_{(3,4)}$ |
| $\delta''_{(4,1)}$ | $\delta''_{(4,2)}$ | $\delta''_{(4,3)}$ | $\delta''_{(4,4)}$ |

FIG. 16C

| $\delta_{(1,1)}$ | $\delta_{(1,2)}$ | $\delta_{(1,3)}$ | $\delta_{(1,4)}$ |
|---|---|---|---|
| $\delta_{(2,1)}$ | $\delta_{(2,2)}$ | $\delta_{(2,3)}$ | $\delta_{(2,4)}$ |
| $\delta_{(3,1)}$ | $\delta_{(3,2)}$ | $\delta_{(3,3)}$ | $\delta_{(3,4)}$ |
| $\delta_{(4,1)}$ | $\delta_{(4,2)}$ | $\delta_{(4,3)}$ | $\delta_{(4,4)}$ |

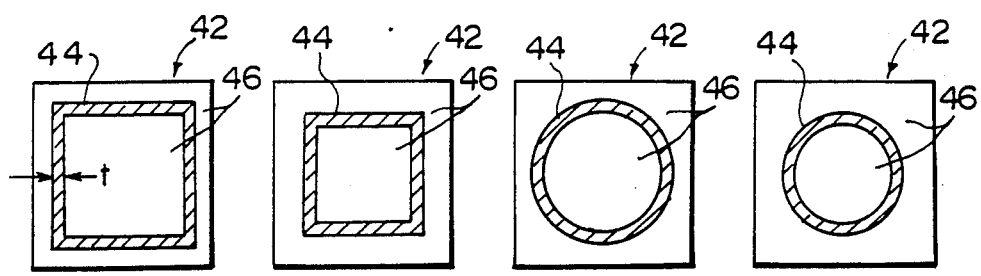
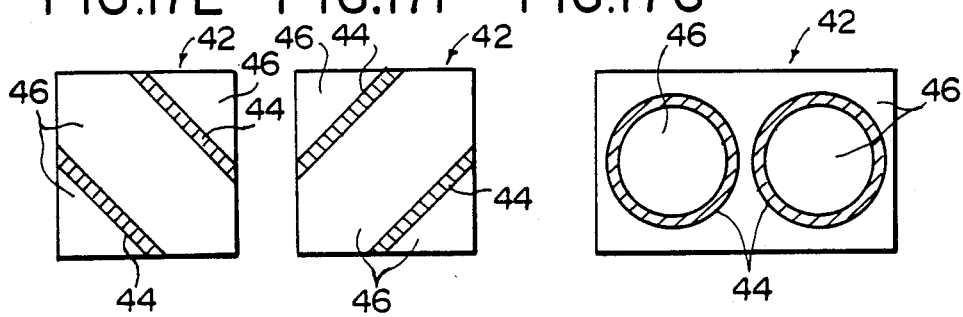
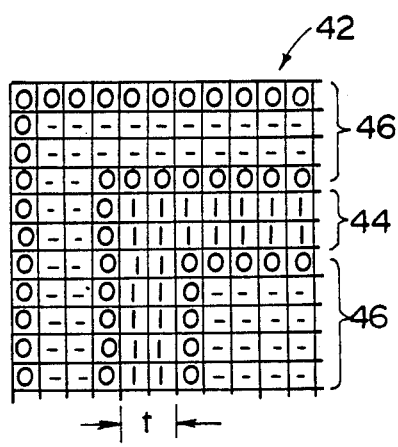
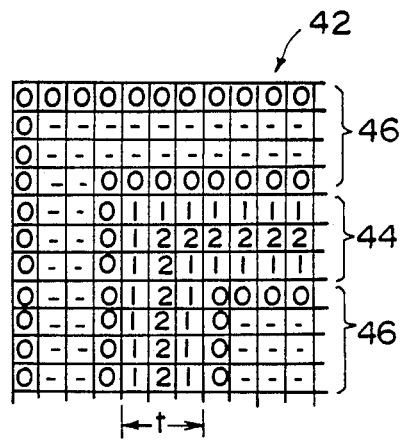

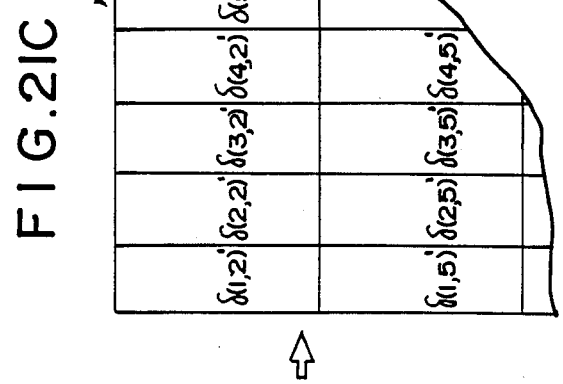
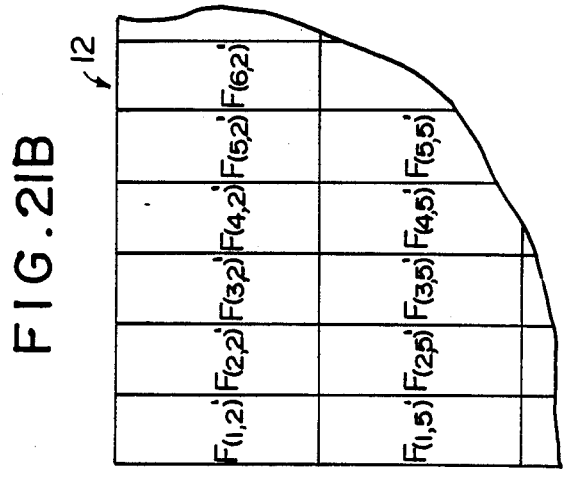
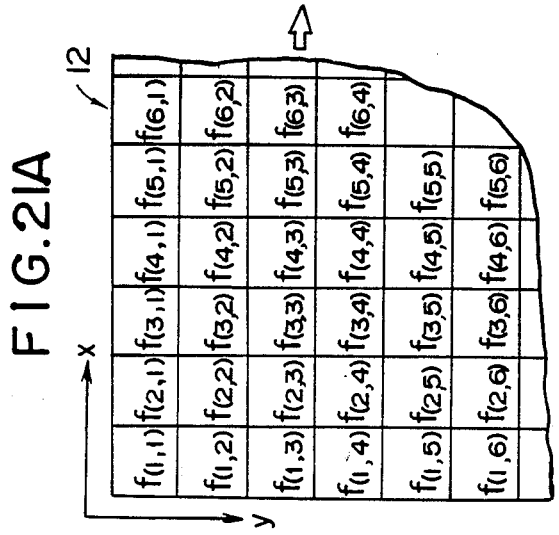
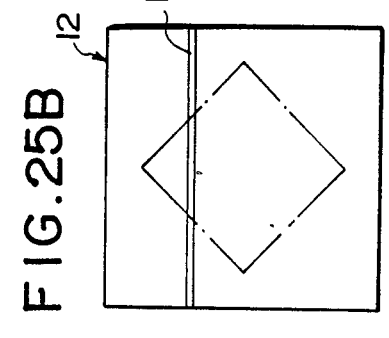
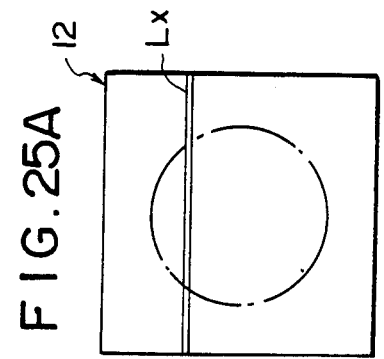
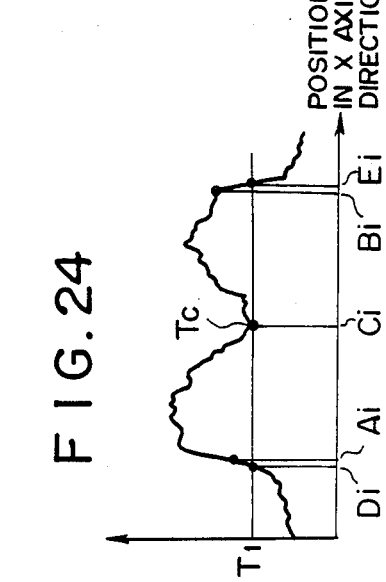

METHOD OF ADJUSTING RADIATION IMAGE READ-OUT CONDITIONS

This is a continuation of application Ser. No. 760,862 filed July 31, 1985.

BACKGROUND OF THE INVENTION

1. Field of the Invention

This invention relates to a method of adjusting radiation image read-out conditions in a radiation image recording and reproducing system using a stimulable phosphor.

2. Description of the Prior Art

When certain kinds of phosphors are exposed to a radiation such as X-rays, $\alpha$-rays, $\beta$-rays, $\gamma$-rays, cathode rays or ultraviolet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed in U.S. Pat. No. 4,258,264 and Japanese Unexamined Patent Publication No. 56(1981)-11395, it has been proposed to use a stimulable phosphor in a radiation image recording and reproducing system. Specifically, a sheet provided with a layer of the stimulable phosphor (hereinafter referred to as a stimulable phosphor sheet) is first exposed to a radiation passing through an object to have a radiation image stored therein, and is then scanned with stimulating rays such as a laser beam which cause it to emit light in the pattern of the stored image. The light emitted by the stimulable phosphor sheet upon stimulation thereof is photoelectrically detected and converted to an electric image signal, which is processed as desired to reproduce a visible image on a recording medium such as a photographic light-sensitive material or on a display device such as a cathode ray tube (CRT).

One embodiment of the aforesaid radiation image recording and reproducing system is disclosed, for example, in Japanese Unexamined Patent Publication No. 58(1983)-67240. In the embodiment, before final read-out is conducted by scanning the stimulable phosphor sheet carrying a radiation image of an object stored therein by stimulating rays which cause the stimulable phosphor sheet to emit light in proportion to the radiation energy stored, detecting the emitted light by a photoelectric read-out means and converting it into an electric image signal, preliminary read-out for approximately detecting the image information stored in the stimulable phosphor sheet is conducted by use of stimulating rays of a level lower than the level of the stimulating rays used in the final read-out. Read-out conditions for the final read-out are adjusted on the basis of the information obtained by the preliminary read-out, and the final read-out is conducted by use of the read-out conditions. The electric image signal obtained by the final read-out is sent to an image processing means and is processed in accordance with the image recording portion of the object and/or the image recording method to obtain a visible image suitable for viewing, particularly for diagnostic purposes. The processed image signal is used to reproduce the visible image on a photographic film or the like.

By the term "read-out conditions" as used herein are meant various conditions affecting the relationship between the amount of the light emitted by the stimulable phosphor sheet at the read-out step and the output of the read-out apparatus, for example, the read-out gain (sensitivity) determining the relationship between the input and the output of the read-out apparatus, the scale factor (latitude), and the power of the stimulating rays used for read-out.

As described above, the level of the stimulating rays used in the preliminary read-out is lower than the level of the stimulating rays used in the final read-out. That is, the effective energy of the stimulating rays which the stimulable phosphor sheet receives per unit area in the preliminary read-out should be lower than the effective energy of the stimulating rays used in the final read-out. In order to make the level of the stimulating rays used in the preliminary read-out lower than the level of the stimulating rays in the final read-out, the output of the stimulating ray source such as a laser beam source may be decreased in the preliminary read-out, or the stimulating rays emitted by the stimulating ray source may be attenuated by an ND filter, an AOM, or the like positioned on the optical path. Alternatively, a stimulating ray source for the preliminary read-out may be positioned independently of the stimulating ray source for the final read-out, and the output of the former may be made lower than the output of the latter. Or, the beam diameter of the stimulating rays may be increased, the scanning speed of the stimulating rays may be increased, or the moving speed of the stimulable phosphor sheet may be increased in the preliminary read-out.

When the image information stored in the stimulable phosphor sheet is approximately grasped prior to the final read-out and the final read-out is conducted by use of the read-out conditions adjusted on the basis of the image information, it becomes possible to eliminate adverse effects of a fluctuation in the level of the radiation energy stored in the stimulable phosphor sheet, which is caused by a change in the object or the image recording portion thereof, by a fluctuation in the radiation dose, or the like, and to conduct the final read-out by use of desirable read-out conditions.

In Japanese Patent Application No. 59(1984)-12658, the applicant proposed a novel method of adjusting the read-out conditions for the final read-out on the basis of the image information obtained by the preliminary read-out. The method comprises the steps of: determining a histogram of the amount of light emitted by the stimulable phosphor sheet in the preliminary read-out, calculating the maximum light emission amount Smax and the minimum light emission amount Smin of a desired image information range in the histogram, and adjusting the read-out conditions so that the maximum light emission amount Smax and the minimum light emission amount Smin correspond respectively to the maximum signal level Qmax and the minimum signal level Qmin of a desired input signal range in the image processing means which are determined by the maximum density Dmax and the minimum density Dmin of a correct density range in the reproduced visible image.

On the other hand, in the case where the radiation image recording and reproducing system is used for medical diagnosis, portions of the human body not related to diagnosis should not be exposed to radiation since the radiation is harmful to the human body. Further, when the human body portions not related to diagnosis are exposed to radiation, the radiation is scattered by such portions to the portion related to the diagnosis, and the contrast and resolution are adversely affected by the scattered radiation. Therefore, in many cases, the radiation exposure field should be limited when a radiation image is recorded. Normally, when the radiation exposure field is limited, radiation scattered by the object within the radiation exposure field passes outside of the radiation exposure field. The scattered radiation is absorbed and stored in the stimulable phosphor sheet which exhibits high sensitivity, and therefore the histogram of the light emission amount obtained by the preliminary read-out includes the light emission amount caused by the scattered radiation. Since the light emission amount caused by the scattered radiation outside of the radiation exposure field on the stimulable phosphor sheet is often larger than the light emission amount within the radiation exposure field, it is not always possible to discriminate between the light emission amounts inside and outside of the radiation exposure field in the histogram obtained by the preliminary read-out. As a result, when Smax and Smin are calculated from the histogram as described above and the read-out conditions are adjusted on the basis of Smax and Smin, the minimum light emission amount within the radiation exposure field is not detected as Smin, and that caused by the scattered radiation outside of the radiation exposure field is detected as Smin. In general, the minimum light emission amount outside of the radiation exposure field is smaller than that within the radiation exposure field. Accordingly, when the minimum light emission amount outside of the radiation exposure field is detected as Smin, signals caused by the scattered radiation not related to diagnosis is taken within a low density range in the final read-out, and the density of the image of the portion related to diagnosis becomes too high. As a result, the image contrast decreases and it becomes difficult to make an accurate diagnosis.

Namely, when a radiation image is recorded by limiting the radiation exposure field, radiation scattered by the object passes outside of the radiation exposure field on the stimulable phosphor sheet and causes noise in the image information obtained by the preliminary read-out. Therefore, when the read-out conditions are adjusted on the basis of such preliminary read-out image information, it is not always possible to adjust the read-out conditions to appropriate values and to obtain a visible image suitable for viewing, particularly for diagnostic purposes.

SUMMARY OF THE INVENTION

The primary object of the present invention is to provide a method of adjusting radiation image read-out conditions for final read-out to appropriate values on the basis of image information obtained by preliminary read-out, wherein problems caused by exposure field limiting are eliminated when image recording is conducted by limiting the radiation exposure field.

Another object of the present invention is to provide a method of adjusting radiation image read-out conditions wherein the range of radiation exposure field on a stimulable phosphor sheet is detected accurately on the basis of image information obtained by preliminary read-out, whereby the read-out conditions are adjusted to appropriate values.

Still another object of the present invention is to provide a method of detecting an exposure field of an image in an image read-out process in which the image is photoelectrically read out to obtain image information so that the image processing conditions can be determined on the basis of the image information within the exposure field.

The present invention provides a method of adjusting radiation image read-out conditions in which preliminary read-out conducted by exposing a stimulable phosphor sheet carrying a radiation image of an object stored therein by limitation of a radiation exposure field to stimulating rays of a level lower than the level of stimulating rays used in final read-out and detecting the radiation image stored in the stimulable phosphor sheet is carried out prior to the final read-out wherein the stimulable phosphor sheet is exposed to stimulating rays which cause the stimulable phosphor sheet to emit light in proportion to the stored radiation energy and the emitted light is photoelectrically detected to obtain electric image signals used for reproducing a visible image, and read-out conditions in the final read-out are adjusted on the basis of the image information obtained by the preliminary read-out, wherein the improvement comprises detecting digital image signals at respective positions on said stimulable phosphor sheet on the basis of the image information obtained by said preliminary read-out, subjecting said digital image signals to a differentiation processing, detecting the radiation exposure field on said stimulable phosphor sheet by use of the differentiated values obtained thereby, and adjusting the read-out conditions in said final read-out on the basis of the image information obtained within said radiation exposure field by said preliminary read-out.

By "image information obtained by preliminary read-out" is meant the information which is obtained by detecting the light emitted by the stimulable phosphor sheet during preliminary read-out scanning with stimulating rays by use of a photoelectric conversion means and which is constituted by electric signals corresponding to light emission amounts at respective scanning points, i.e. picture elements, on the stimulable phosphor sheet. Of course, the information corresponds to the radiation image stored in the stimulable phosphor sheet.

In order to detect digital image signals at the respective positions on the stimulable phosphor sheet on the basis of the image information, it is necessary to define the positions on the sheet. The positions may be defined in the unit of picture element, or a plurality of picture elements in predetermined relation, for example, three to five picture elements adjacent to each other in a predetermined direction, may be defined as one position. In the former case, the digital image signals at respective positions mean the signals obtained by digitizing the image information at the picture elements corresponding to the respective positions. In the latter case, the digital image signals at respective positions mean those detected on the basis of the image information at a plurality of the picture elements included in the respective positions, for example, those obtained by averaging the image information at a plurality of the picture elements. In the latter case, the positions are defined by conducting a pre-processing (linear or non-linear filtering) of the image information obtained at respective picture elements by the preliminary read-out, for example, by conducting one-dimensional smoothing of the image information at respective picture elements at intervals of three to five lines. The manner in which the positions are defined, i.e. the type of the pre-processing, may be selected on the basis of the shape of the radiation exposure field on the stimulable phosphor sheet, or the like. The shape of the radiation exposure field (e.g., circular or rectangular) is known in advance when the radiation exposure field is limited. When the radiation exposure field is rectangular, x and y axes may be selected along two adjacent sides of the rectangle, and sets of several lines in the x and y axis directions may be one-dimensionally smoothed.

After the digital image signals at respective positions are obtained, they are subjected to a differentiation processing, which may be one-dimensional differentiation of first or higher order, and may be two-dimensional differentiation of first or higher order. For a discretely sampled image, differentiation is equivalent to calculation of differences between image signals present in the vicinity. The image signals subjected to difference calculation may be selected on the basis of the shape of the radiation exposure field which is known in advance. The term "presence in the vicinity" embraces not only the case where the image signals are present adjacent to each other but also the case where they are present alternately. For example, when the radiation exposure field is rectangular, x and y axes may be selected as described above, and differences between image signals at positions adjacent to each other along the x and y axis directions may be calculated.

After differentiated values are obtained by the differentiation processing of the image signals, the radiation exposure field on the stimulable phosphor sheet is detected by use of the differentiated values. Since the image signals are proportional to the level of radiation energy incident on the stimulable phosphor sheet, image signals outside of the radiation exposure field generally have low quantum levels, and those within the radiation exposure field generally have high quantum levels. Therefore, differences between image signals at a portion where the contour of the radiation exposure field is positioned generally have quantum levels higher than those of differences between image signals at the other portions, and the radiation exposure field can be detected by use of the differences. For example, when the differences are added along the contour of an assumed radiation exposure field, e.g. along the aforesaid x and y axes in the case where the radiation exposure field is rectangular, the sum of the differences at the contour becomes far larger than that at the other portions, and it becomes possible to detect the position of the radiation exposure field.

The radiation exposure field is detected as described above, and then read-out conditions in final read-out are adjusted on the basis of the image information obtained within the radiation exposure field by the preliminary read-out. The read-out conditions may be adjusted in various manners, for example, by creating a histogram of the light emission amounts within the radiation exposure field, calculating maximum light emission amount Smax and minimum light emission amount Smin, and adjusting the read-out conditions on the basis of Smax and Smin.

The read-out conditions may be adjusted on the basis of the preliminary read-out image information within the radiation exposure field and by considering the image recording portion of the object such as the head, the chest or the abdomen and the image recording method such as plain image recording, contrasted image recording, tomography or enlarged image recording.

After the radiation exposure field is detected and the read-out conditions for the final read-out are adjusted on the basis of the image information within the radiation exposure field, the final read-out is conducted by use of the read-out conditions. As described in Japanese Patent Application No. 58(1983)-228163, the final read-out region should preferably be limited within the radiation exposure field. When the final read-out region is limited within the radiation exposure field, noise components caused by scattered radiation and stored outside of the radiation exposure field on the stimulable phosphor sheet are not read out, and it is possible to obtain a reproduced visible image having a high image quality. Also, since the read-out region is limited, it becomes possible to shorten the read-out time or to increase the read-out density.

In the method of the present invention, since adverse effects of scattered radiation incident outside of the radiation exposure field on the stimulable phosphor sheet are eliminated when the radiation exposure field is limited in image recording and the read-out conditions are adjusted on the basis of the effective image information within the radiation exposure field on the sheet, it is always possible to adjust the read-out conditions to appropriate values.

Particularly, in the method of the present invention, since the radiation exposure field is directly detected on the basis of differentiated values obtained by the differentiation processing of the preliminary read-out image signals, i.e. on the basis of the image information stored in the stimulable phosphor sheet, it is possible to detect the radiation exposure field accuratelY, and therefore to adjust the read-out conditions accurately to appropriate values.

Also, when the differentiation processing is conducted after pre-processing the preliminary read-out image information at respective picture elements as described above, it is possible to eliminate the adverse effects of noise included in the image information by the pre-processing and to decrease the image signals subjected to the differentiation processing and the like. Therefore it becomes possible to detect the radiation exposure field more accurately and quickly.

BRIEF DESCRIPTION OF THE DRAWINGS

FIG. 1 is a schematic view showing the relationship between the stimulable phosphor sheet and the radiation exposure field in an embodiment of the method of adjusting radiation image read-out conditions in accordance with the present invention, FIG. 2A is a schematic view showing the image information at respective picture elements, FIG. 2B is a schematic view showing the digital image signals at respective positions obtained from the image information at respective picture elements, FIG. 2C is a schematic view showing the differences between image signals in the vicinity which are calculated by the differentiation processing of the image signals at respective positions, FIGS. 7 and 8A to 8D are schematic views showing the masks used for finding new remark points, FIGS. 9A to 9E is an explanatory views showing the method of finding new remark points by use of the mask of FIG. 7, FIGS. 10A to 10G are explanatory views showing the method of finding new remark points by use of the masks of FIGS. 8A to 8D, FIGS. 11 and 12A to 12D are schematic views showing the masks used for finding new remark points in a further embodiment of the read-out condition adjusting method in accordance with the present invention, FIGS. 13A to 13E are explanatory views showing the method of finding new remark points by use of the mask of FIG. 11, FIGS. 14A to 14I are explanatory views showing the method of finding new remark points by use of the masks of FIGS. 12A to 12D, FIG. 15 is an enlarged view of the upper left corner portion of the stimulable phosphor sheet shown in FIG. 1 and showing the digital image signals at respective positions in a still further embodiment of the read-out condition adjusting method in accordance with the present invention, FIGS. 16A, 16B and 16C are schematic views showing differentiated images respectively obtained by one-dimensional first order differentiation of the digital image signals of FIG. 15 in the x direction, one-dimensional first order differentiation thereof in the y direction, and two-dimensional first order differentiation thereof in the x and y directions, FIGS. 17A to 17G are schematic views showing examples of the multi-valued image templates, FIGS. 18 and 19 are partially enlarged views showing the multi-valued image templates, FIG. 24 is a graph showing another example of the digital image signals on line Lxn, FIGS. 25A and 25B are schematic views showing the stimulable phosphor sheets exposed to a radiation by limiting the radiation exposure field in a circular form and in a rectangular form.

DESCRIPTION OF THE PREFERRED EMBODIMENTS

Figure 3A:
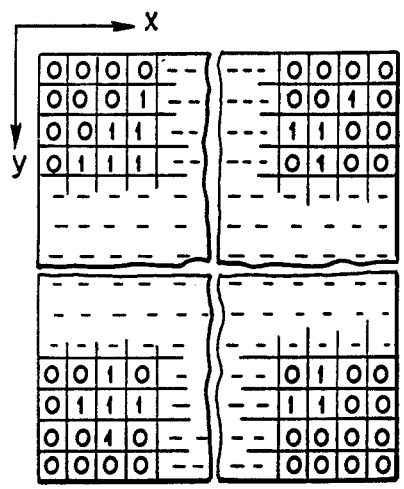
FIG. 3A is a schematic view showing the difference signals obtained by converting the differences in FIG. 2C into two-valued system.

The present invention will hereinbelow be described in further detail with reference to the accompanying drawings.

Referring to FIG. 1, a stimulable phosphor sheet 1 is exposed to a radiation by limiting a radiation exposure field 2 in a rectangular form as indicated by the chain line.

First, the x and y axes are selected along two adjacent sides of the rectangular contour of the radiation exposure field 2 indicated by the chain line. When the contour of the stimulable phosphor sheet 1 and the contour of the radiation exposure field 2 are parallel with each other as shown in FIG. 1, the selected x and y axis directions generally coincide with the main scanning direction and the sub-scanning direction in preliminary read-out and/or final read-out.

Then, the position of an exposure field contour $2a$ in the y axis direction is detected as described below.

First, digital image signals at respective positions on the stimulable phosphor sheet 1 are detected from image information obtained by the preliminary read-out. In this embodiment, as shown in FIG. 2A, digital image signals $f(x,y)$ are obtained by detecting the light emitted from picture elements on the sheet 1 by use of a photoelectric read-out means in the preliminary read-out. The line of $f(1,1)$, $f(2,1)$, $f(3,1)$, ..., in the x axis direction is taken as the first line, and the line of $f(1,2)$, $f(2,2)$, $f(3,2)$, ..., is taken as the second line. In the same manner, the third line, the fourth line, and the subsequent lines are determined sequentially. Then, the digital image signals $f(x,y)$ are pre-processed by one-dimensionally smoothing each set of three lines to obtain digital image signals $F(x,y)$ at respective positions as shown in FIG. 2B. Specifically, the first line, the second line and the third line are one-dimensionally smoothed by calculating as shown below.

$$(f(1,1) + f(1,2) + f(1,3))/3 = F(1,2)$$

$$(f(2,1) + f(2,2) + f(2,3))/3 = F(2,2)$$

$$\vdots$$

$$(f(1,4) + f(1,5) + f(1,6))/3 = F(1,5)$$

$$(f(2,4) + f(2,5) + f(2,6))/3 = F(2,5)$$

In the same manner, all of $f(x,y)$ are one-dimensionally smoothed at three-line intervals to obtain digital image signals $F(x,y)$ at the respective positions. Therefore, in this case, three picture elements adjacent in the y axis direction are selected as one position, and the digital image signal at this position is obtained by arithmetic averaging of $f(x,y)$ at the three picture elements.

The smoothing may be conducted at any line intervals. When it is conducted at n line intervals, $F(x,y)$ is expressed by $$F(x,y) = \frac{1}{n} \sum_{y_i=y-\frac{n}{2}}^{y+\frac{n}{2}} f(x,y_i)$$

In the smoothing method, since the arithmetic averaging is effected in the x axis direction when the edge of the radiation exposure field in the y axis direction is detected, the edge is not blurred in the y axis direction, and it is possible to decrease noise adversely affecting the edge extraction in the differentiation processing conducted later. Also, since the calculation is simple, the smoothing can be carried out quickly.

After digital image signals F(x,y) at the respective positions are obtained, they are subjected to a differentiation processing in which difference between digital image signals F(x,y) at positions present in the vicinity are calculated. In this embodiment, as shown in FIG. 2C, differences Δ(x,y) between image signals F(x,y) at positions adjacent in the x axis direction are calculated. Namely, the differentiation processing is conducted by $$|F(1,2) - F(2,2)| = \Delta(1,2)$$
$$|F(2,2) - F(3,2)| = \Delta(2,2)$$
$$\vdots$$
$$|F(1,5) - F(2,5)| = \Delta(1,5)$$
$$|F(2,5) - F(3,5)| = \Delta(2,5)$$
$$\vdots$$

The differentiation processing in the present invention embraces not only the case where the differences between image signals adjacent to each other are obtained but also the case where the differences between image signals alternately adjacent to each other in the x axis direction, i.e. between F(1,2) and F(3,2) and so on, are calculated.

Then, an appropriate threshold value TL1 is determined, and differences Δ(x,y) are converted into two-valued system, i.e. "1" when they are not smaller than TL1 and "0" when they are smaller than TL1. In this manner, the difference signals as shown in FIG. 3A are obtained.

The smoothing method and the differentiation processing method described above are mere examples, and the differentiation processing may be conducted without smoothing, or by using Laplacian operators. However, the aforesaid methods are advantageous since the calculation can be conducted quickly and the edge of the radiation exposure field can be detected more securely than the edges of the bone or the like in the object.

Figure 3B:
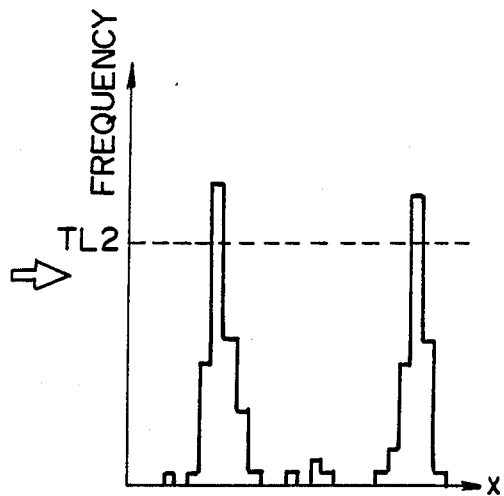
FIG. 3B is a graph showing the histogram obtained by addition of the difference signals in FIG. 3A.

Then, the two-valued difference signals Δ'(x,y) are added in the y axis direction. Specifically, the difference signals on the same x coordinate are added in the y axis direction by formulas $$\Delta'(1,2) + \Delta'(1,5) + \ldots$$
$$\Delta'(2,2) + \Delta'(2,5) + \ldots$$
$$\Delta'(3,2) + \Delta'(3,5) + \ldots$$

and the histogram as shown in FIG. 3B is created. In the histogram, the x coordinates at which the frequency is larger than a predetermined threshold value TL2 are judged as the positions of the exposure field contours 2a in the y axis direction.

Figure 4A:
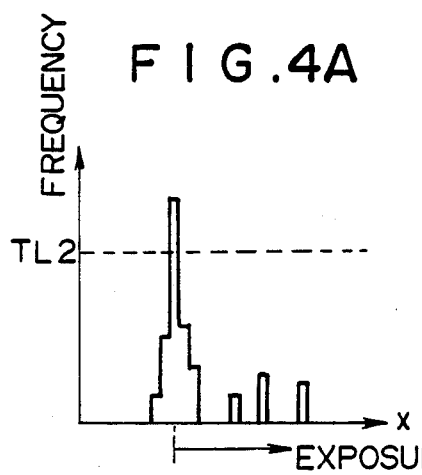
FIG. 4A is a graph showing the histogram different from that in FIG. 3B.
Figure 4B:
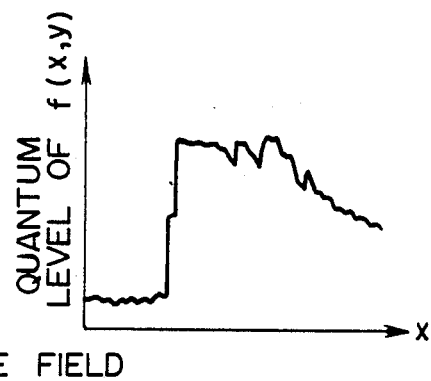
FIG. 4B is a graph showing the quantum levels of the image information at the respective picture elements in the case where the histogram of FIG. 4A is obtained.

When no x coordinate at which the frequency exceeds the threshold value TL2 is present, it is recognized that the radiation exposure field was not limited. When there is only one x coordinate at which the frequency exceeds the threshold value TL2 as shown in FIG. 4A, the quantum levels of the original f(x,y) are investigated as shown in FIG. 4B, and the side exhibiting a higher average quantum level is judged as the radiation exposure field.

After the positions (x coordinates) of the exposure field contours 2a in the y axis direction are detected, the positions (y coordinates) of exposure field contours 2b in the x axis direction shown in FIG. 1 are detected in the same manner. Specifically, image signals F(x,y) at the respective positions are detected by smoothing a plurality of lines of f(x,y) in the y axis direction, and differences Δ(x,y) between F(x,y) adjacent in the y axis direction are calculated. The differences Δ(x,y) are converted into two-valued system by using a predetermined threshold value TL1', and the two-valued signals are added in the x axis direction to create a histogram. The y coordinates at which the frequency exceeds a predetermined threshold value TL2' are judged as the positions of the exposure field contours 2b in the x axis direction. When there is no such y coordinate or when there is only one such y coordinate, judgement is made in the same manner as for the contours 2a in the y axis direction.

When the positions of the exposure field contours 2b in the x axis direction are detected, since the positions of the exposure field contours 2a in the y axis direction have already been detected, it is sufficient that the aforesaid processing is conducted only on the image signals f(x,y) between the exposure field contours 2a in the y axis direction. Thus it is possible to increase the speed of detecting the radiation exposure field.

The radiation exposure field is detected as described above, and then the read-out conditions for the final read-out are adjusted on the basis of the preliminary read-out image information within the radiation exposure field. The read-out conditions may be adjusted in various manners, for example, by obtaining a histogram of the light emission amounts within the radiation exposure field as described above, calculating the maximum light emission amount Smax and the minimum light emission amount Smin from the histogram, and adjusting the read-out conditions such as the read-out gain (sensitivity) and the scale factor (latitute) on the basis of Smax and Smin.

Thereafter, the final read-out is carried out by use of the adjusted read-out conditions. In the final read-out, the read-out region should preferably be limited within the detected radiation exposure field.

In the aforesaid embodiment, since the image information obtained by the preliminary read-out is proportional to the level of radiation energy incident on the stimulable phosphor sheet, predetermined positions are set on the sheet, and differences between image signals at positions in the vicinity are calculated. Since the differences become large when the exposure field contour is present between the compared positions, the position of the radiation exposure field is detected on the basis of the differences. In some cases, the differences at the boundary between soft tissues and the bone or the like within the radiation exposure field may become nearly equal to those at the exposure field contour, and it becomes necessary to discriminate between them. In such a case, the exposure field contour may be detected in various manners, for example, by utilizing the shape of the exposure field known in advance as in the aforesaid embodiment and adding the differences along the contour of the exposure field shape.

The aforesaid embodiment may also be applied to the cases of radiation exposure fields of various shapes other than rectangle, for example, circular radiation exposure fields, by calculating the differences in appropriate directions in accordance with the shapes of the radiation exposure fields and by using appropriate judgement methods such as addition.

In the present invention, the radiation exposure field may also be detected by, in the differentiated image constituted by the differentiated values obtained by the differentiation processing, selecting an arbitrary position at which the differentiated value is the maximum or not smaller than a predetermined value as a first remark point, finding a position at which the differentiated value is the maximum among the positions adjacent the first remark point and selecting said position as a second remark point, finding a position at which the differentiated value is the maximum among the positions adjacent the second remark point and outside of the previous remark point and selecting said position as a third remark point, thereafter repeating the step of finding the third remark point to find new remark points sequentially until a position adjacent said first remark point is found as a new remark point, and recognizing the inside of the closed curve passing through the found remark points as the radiation exposure field. Such an embodiment will be described below with reference to FIGS. 5A to 10G. In this embodiment, the positions adjacent the remark point need not necessarily be all of the positions which are adjacent the remark point. For example, when the shape of the radiation exposure field is known in advance, only a part of the positions adjacent the remark point that are fixed by the shape of the radiation exposure field may be considered as the aforesaid positions adjacent the remark point.

In this embodiment, digital image signals at respective positions on the stimulable phosphor sheet may be detected by conducting a pre-processing such as a spatial filter processing. In this case, the positions on the sheet may be determined in the picture element unit, and the digital image signal at each position may be calculated on the basis of the preliminary read-out image information on a plurality of the picture elements corresponding to the position and positions therearound. As the calculation method, it is possible to use the median filter processing in which the median value of the image information (quantization levels) at a predetermined picture element (position) and the picture elements (positions) therearound is employed as the image information at the predetermined picture element (position).

Figure 5A:
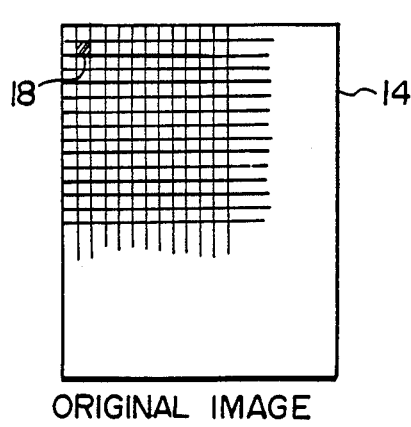
FIG. 5A is a schematic view showing the original image constituted by preliminary read-out image information at respective picture elements in another embodiment of the read-out condition adjusting method in accordance with the present invention.
Figure 5B:
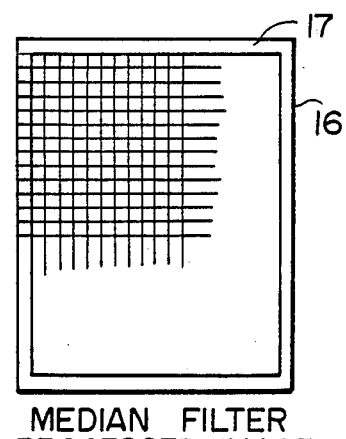
FIG. 5B is a schematic view showing the processed image obtained by a median filter processing of the original image of FIG. 5A, FIGS. 6A and 6B are schematic views showing the positions in the processed image of FIG. 5B and the masks used for conducting the differentiation processing.

An example of the median filter processing will be described with reference to FIGS. 5A and 5B. FIG. 5A shows an original image 14 constituted by the preliminary read-out image information at respective picture elements indicated by cells. FIG. 5B shows a median filter processed image 16 constituted by digital image signals obtained at respective positions by carrying out the median filter processing on the image information at respective picture elements in the original image. In this embodiment, since the positions are determined in the picture element unit, the respective positions in the processed image 16 are also referred to as the picture elements.

First, a mask 18 having a predetermined size, for example, the 3×3 size covering 3×3 picture elements, is positioned on the original image 14 so that the mask center coincides with a predetermined picture element indicated by hatching in FIG. 5A. The median value of the image information at nine picture elements covered by the mask is digitized and detected as the digital image signal at the predetermined picture element. This processing is conducted for all picture elements of the original image 14 outside of those at the peripheral portion 17. Thus digital image signals at the picture elements are detected, and the median filter processed image 16 constituted by the digital image signals is obtained. When the 3×3 size mask is used, since the median filter processing cannot be applied to the picture elements at the peripheral portion 17 of the image, the processing image 16 becomes smaller by the picture elements at the peripheral portion 17 than the original image 14. In this case, zero quantization level may be assigned as the image signals to the picture elements at the peripheral portion 17. The mask size is not limited to 3×3. Also, in order to prevent the processed image 16 from becoming small, the median filter processing may be conducted by assuming that picture elements having the same quantization levels as those of the picture elements at the peripheral portion of the original image are present around the original image 14. The median filter processing is advantageous in that noise causing the quantization level of the picture element to become extremely higher or lower than those of the surrounding picture elements can be eliminated and that the information on the exposure field contour is not blurred.

The aforesaid pre-processing is not limited to the median filter processing and may be any spatial filter processing insofar as unnecessary information such as noise is eliminated while the necessary information on the exposure field contour or the like is maintained.

After the digital image signals at the respective positions on the stimulable phosphor sheet are detected, the digital image signals are subjected to a differentiation processing, and a differentiated image constituted by the differentiated values is created. The differentiation processing may be conducted in any manner, for example, as described below.

Figure 6A:
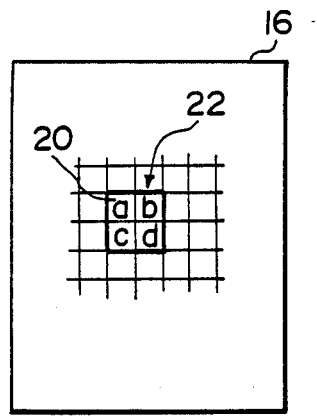
Figure 6B:
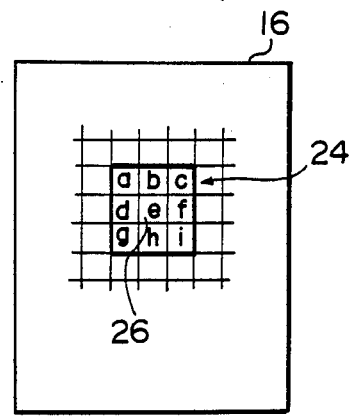

FIGS. 6A and 6B show processed images in which each cell indicates one position. For example, when the digital image signal at a predetermined position 20 in the processed image 16 is differentiated, a mask 22 having a size of 2×2 picture elements may be used as shown in FIG. 6A. The mask 22 is positioned so that the left upper portion thereof coincides with the predetermined position 20. Digital image signals a, b, c and d at four positions covered by the mask 22 are subjected to a calculation by $$a' = \sqrt{(a-d)^2 + (b-c)^2}$$

and a' thus obtained is taken as the differentiated value at the predetermined position 20. The differentiating calculation is conducted for respective positions. Or, the differentiation processing may be carried out by calculating $$a' = \sqrt{(a - b + c - d)^2 + (a - c + b - d)^2}$$

Of course, other differentiation formulas may be used.

Further, besides the first order differentiation processing described above, a second order differentiation processing may be conducted. For example, as shown in FIG. 6B, a mask 24 having the size of 3×3 picture elements may be positioned so that the mask center coincides with a predetermined position 26. In this case, digital image signals a, b, c, d, e, f, g, h and i at nine positions covered by the mask 24 are subjected to a calculation by $$e' = \left| e - \frac{a + b + c + d + f + g + h + i}{8} \right|$$

and e' thus obtained is taken as the differentiated value at the predetermined position 26.

Thereafter, the contour of the radiation exposure field is detected on the basis of the differentiated image created as described above. Since the quantum level of the differentiated value of the image signal at the exposure field contour becomes higher than those of differentiated values of image signals at the other positions as described above, the position in the differentiated image at which the differentiated value is the maximum or not smaller than a value predetermined appropriately may be recognized as the exposure field contour. Also, the exposure field contour is formed by one closed curve. Therefore, when one position at which the exposure field contour is present is remarked, there is always a new position at which the exposure field contour is present among the surrounding positions adjacent the remarked position, and the differentiated value at the new position is larger than those at the surrounding positions adjacent the new position. Stated differently, the exposure field contour is present at least at the position exhibiting the maximum differentiated value among the adjacent positions.

Accordingly, in this embodiment, the exposure field contour is detected by sequentially tracking the positions in the differentiated image at which the exposure field contour is present. The embodiment comprises the step of detecting the tracking start point a first remark point, and the step of tracking the contour positions from the first remark point.

First, the differentiated image is scanned to find an arbitrary position at which the differentiated value is the maximum or not smaller than a predetermined value, and the found position is selected as the first remark point.

Since the differentiated value at the position where the exposure field contour is present is larger than those at the other positions as described above, when an appropriately predetermined value is used, the position at which the differentiated value is not smaller than the predetermined value may be regarded as the position where the exposure field contour is present. Also, the position at which the differentiated value is the maximum may be regarded as the position at which the exposure field contour is present. Therefore, one of the positions at which the exposure field contour is present is first detected as described above, and is selected as the first remark point.

Then, tracking of the exposure field contour is started from the first remark point to recognize the radiation exposure field. In the tracking, the position at which the differentiated value is the maximum is found from among the positions adjacent the first remark point, and is selected as a second remark point. The position at which the differentiated value is the maximum is then found from among the positions adjacent the second remark point and outside of the previous remark point (i.e. the first remark point), and is selected as a third remark point. The step of finding the third remark point is repeated to find new remark points sequentially. When a position adjacent the first remark point is found as the new remark point, the inside of the closed curve passing through the remark points thus found is recognized as the radiation exposure field.

The above-mentioned tracking may be conducted by use of masks as shown in FIGS. 7 and 8A to 8D.

The mask shown in FIG. 7 has a size of 3×3 picture elements. For example, when the rectangular exposure field contour as shown in FIGS. 9A to 9E is tracked, the mask is first positioned as shown in FIG. 9A so that the mask center hatched in FIG. 7 coincides with the first remark point A which is present on the exposure field contour in a differentiated image 28 and which has been detected as described above. The position exhibiting the maximum differentiated value among the positions within the mask and outside of the first remark point A is selected as the second remark point B. Then, as shown in FIG. 9B, the mask is moved until the mask center coincides with the second remark point B, and the position exhibiting the maximum differentiated value among the positions within the mask and outside of the previous remark points, i.e. the first remark point A and the second remark point B is selected as the third remark point C. In the same manner, the fourth remark point D and the fifth remark point E are respectively found as shown in FIGS. 9C and 9D. When a position adjacent the first remark point A is found as a new n'th remark point F as shown in FIG. 9E, the inside of a closed curve 30 passing through the found remark points A to F is recognized as a radiation exposure field 10. In FIGS. 9A to 9E, the arrows indicate the tracking direction for finding the exposure field contour.

Unlike the mask shown in FIG. 7 which covers all of the eight picture elements adjacent the remark point, the masks shown in FIGS. 8A to 8D are fabricated to cover only a part (four picture elements) adjacent the remark point and are selected in accordance with the tracking direction. In FIGS. 8A to 8D, the arrows indicate the tracking directions when the masks are used.

Tracking of a rectangular radiation exposure field conducted by use of the masks of FIGS. 8A to 8D will be described below.

Figure 10A:
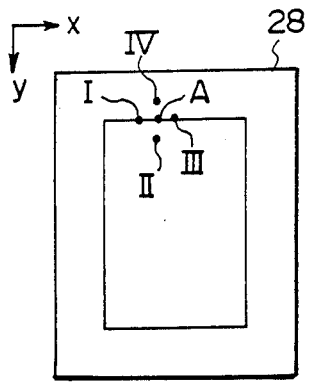

First, as shown in FIG. 10A, the differentiated image is scanned to find the position where the differentiated value is the maximum and the position is selected as the first remark point A, the position exhibiting the maximum differentiated value is found from among positions I, II, III and IV adjacent the first remark point A in the x and y axis directions, and tracking is started from the first remark point A towards the position exhibiting the maximum differentiated value. For example, when the position I exhibits the maximum differentiated value, tracking is started leftwardly towards the position I.

Figure 10B:
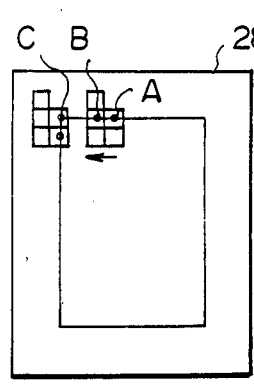
Figure 10C:
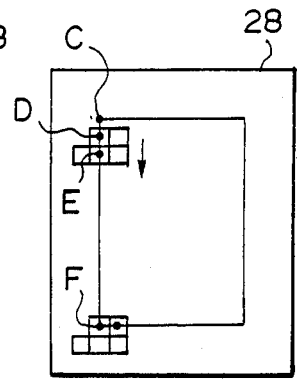
Figure 10D:
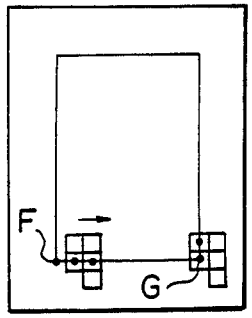
Figure 10E:
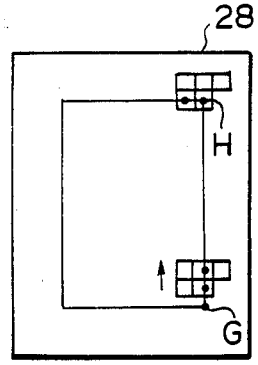
Figure 10F:
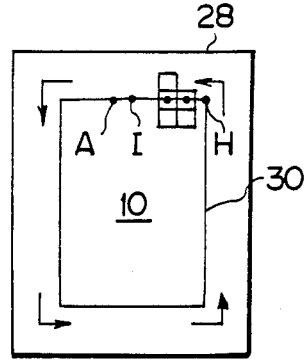

In this case, since the tracking direction is leftward, the mask shown in FIG. 8A is used. As shown in FIG. 10B, the mask is positioned so that the mask portion hatched in FIG. 8A coincides with the first remark point A. The position exhibiting the maximum differentiated value among the positions within the mask and outside of the first remark point A is found as the second remark point B. Then, the mask is moved until the mask portion hatched in FIG. 5A coincides with the second remark point B, and the position exhibiting the maximum differentiated value among the positions within the mask and outside of the previous remark points, i.e. the first and second remark points A and B is found as the third remark point. This step is repeated to find new remark points sequentially. Until the position at the left upper corner is found as a new remark point C as shown in FIG. 10B, since the tracking direction is leftward, a portion b of the mask shown in FIG. 8A always corresponds to the position exhibiting the maximum differentiated value, and remark point detection is continued by use of the mask of FIG. 8A. However, after the position C at the left upper corner is found as the remark point and then a portion d of the mask of FIG. 8A corresponds to the position exhibiting the maximum differentiated value, remark point detection is continued by use of the mask shown in FIG. 8B. Specifically, as shown in FIG. 10C, the mask of FIG. 8B is positioned so that the hatched mask portion coincides with the remark point D, and the next remark point E is detected. Until the position at the left lower corner is found as a remark point F, since the tracking direction is downward, a portion b of the mask of FIG. 8B always corresponds to the position exhibiting the maximum differentiated value, and remark point detection is continued by use of the mask of FIG. 8B. After the position at the left lower corner is found as the remark point F and then the portion d of the mask of FIG. 8B corresponds to the position exhibiting the maximum differentiated value, the mask shown in FIG. 8C is used to detect remark points as shown in FIG. 10D. After the position at the right lower corner is found as a remark point G and then the portion d of the mask of FIG. 8C corresponds to the position exhibiting the maximum remark point, the mask shown in FIG. 8D is used to continue remark point detection as shown in FIG. 10E. In the same manner, after the position at the right upper corner is found as a remark point H and then the mask portion d corresponds to the position exhibiting the maximum differentiated value, the mask shown in FIG. 8A is used to continue remark point detection as shown in FIG. 10F. When a position adjacent the first remark point A is found as a new remark point I, the inside of the closed curve passing through the found remark points is regarded as the radiation exposure field 10. In FIGS. 10A to 10F, the arrows indicate the tracking directions.

Figure 10G:
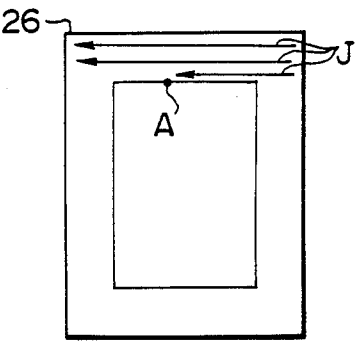

In this embodiment, the position exhibiting the maximum differentiated value in the differentiated image is selected as the first remark point. Also when an arbitrary point where the differentiated value is not smaller than a predetermined value is selected as the first remark point, tracking may be conducted in the same manner. However, when the masks of FIGS. 8A to 8D are used, since the mask used is different in accordance with the tracking direction, it is necessary to determine the tracking direction. In this case, as shown in FIG. 10G, it is also possible to select the scanning direction as indicated by the arrow J for finding the first remark point A as the tracking direction, and initially use the mask for the direction.

When zero is assigned to the peripheral picture element portion 17 in the processed image 16 as shown in FIG. 5B, even though the radiation exposure field is not limited inside of the stimulable phosphor sheet, the differentiated values at the picture elements at the peripheral portion 17 substantially constituting the exposure field contour become large, and the picture element portion is detected as the exposure field contour. When zero is not assigned to the peripheral picture element portion 17 in the processed image 16, the same results may be obtained by conducting the differentiation processing by assuming that zero is present at the periphery.

This embodiment is applicable also to the case of subdivision image recording in which the stimulable phosphor sheet is divided into some divisions and image recording is conducted on each division by limiting the radiation exposure field. In this case, since the radiation exposure field is present at each division, the embodiment may be applied to each division by obtaining in advance the information on the subdivision image recording.

In this embodiment, after the first remark point is found, the second and subsequent remark points are selected by sequentially finding the position exhibiting the maximum differentiated value from among the positions adjacent the preceding remark point and outside of the previous remark point or points. However, it is also possible to select the second and subsequent remark points by sequentially finding the position at which the differentiated value is not smaller than a predetermined value from among the positions adjacent the preceding remark point and outside of the previous remark point or points. Such an embodiment will hereinbelow be described with reference to FIGS. 11 to 14I.

In this embodiment, in the tracking of the exposure field contour starting from the first remark point detected in the same manner as described above, when there is only one position at which the differentiated value is not smaller than the predetermined value among the positions adjacent the preceding remark point, the position may be selected as the next remark point. When there are two or more such positions, a position may be selected as the next remark point in accordance with a priority sequence predetermined for the positions adjacent the preceding remark point. Or, an arbitrary position or the position exhibiting the maximum differentiated value may be selected as the next remark point from such two or more positions. When no such position is present, the position exhibiting the maximum differentiated value among the positions adjacent the preceding remark point may be selected as the next remark point.

The tracking may be conducted as described below by use of the masks shown in FIGS. 11 and 12A to 12D.

FIGS. 13A to 13E show the tracking method using the mask of FIG. 11. First, as shown in FIG. 13A, the mask is positioned so that the mask center hatched in FIG. 11 coincides with the first remark point A detected as described above to be present on the exposure field contour, and a position at which the differentiated value is not smaller than the predetermined value among the positions within the mask and outside of the first remark point A is selected as the second remark point. When there are two or more positions exhibiting differentiated values not smaller than the predetermined value, the position exhibiting the maximum differentiated value may be selected. In this example, since portions a and e of the mask correspond to the exposure field contour positions, the differentiated values at the positions corresponding to the portions a and e are not smaller than the predetermined value. Further, since the differentiated value at the portion e is larger than that at the portion a, the position corresponding to the portion e is selected as the second remark point B.

Then, as shown in FIG. 13B, the mask is moved until the mask center coincides with the second remark point B, and the position at which the differentiated value is not smaller than the predetermined value among the positions within the mask and outside of the first remark point A and the second remark point B is selected as the third remark point C. When there are two or more positions exhibiting the differentiated values not smaller than the predetermined value, the third remark point is selected in accordance with the predetermined priority sequence which may be determined in various manners. In this embodiment, as shown in FIG. 11, when the portion a corresponds to the preceding remark point, the priority is predetermined counterclockwise in the sequence of b, c, d, e, f, g and h starting from the portion a. Therefore, in FIG. 13B, the positions corresponding to the portions e and f exhibit the differentiated values not smaller than the predetermined value among the positions expected as the third remark point, and the position corresponding to the portion e which has the priority to that at the portion f is selected as the third remark point C.

The subsequent remark points are selected in the same manner. When the position adjacent the first remark point A is selected as a new remark point as shown in FIG. 13E, the inside of the closed curve 30 passing through the first remark point A to the n'th remark point F is recognized as the radiation exposure field 10.

In this embodiment, it is also possible to determine a clockwise priority sequence. In this case, the tracking direction becomes clockwise.

Tracking of the rectangular exposure field using the masks shown in FIGS. 12A to 12D will be described below.

Figure 14A:
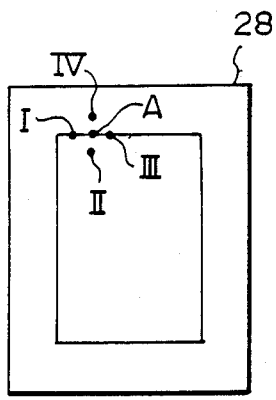
Figure 14B:
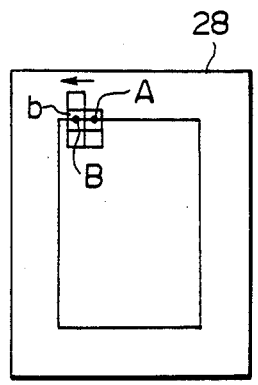

In FIG. 14A, the initial tracking direction is selected leftwardly towards the position I in the same manner as described with reference to FIG. 10A. Since the tracking direction is leftward, the mask of FIG. 12A is used and positioned so that the hatched mask portion coincides with the first remark point A as shown in FIG. 14B. Among the positions within the mask, the position at which the differentiated value is not smaller than the predetermined value and which is outside of the first remark point A is found and selected as the second remark point. In the case shown, since only the position corresponding to the mask portion b exhibits a differentiated value not smaller than the predetermined value, the position is selected as the second remark point B.

Figure 14C:
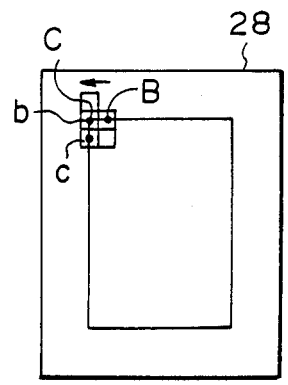
Figure 14D:
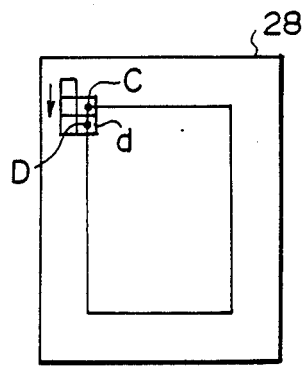

Then, as shown in FIG. 14C, the mask is moved until the hatched mask portion coincides with the second remark point B, and the position at which the differentiated value is not smaller than the predetermined value among the positions within the mask and outside of the previous remark points, i.e. the first and second remark points A and B, is selected as the third remark point. In this example, since the positions corresponding to the portion b and c exhibit differentiated values not smaller than the predetermined value and the priority is predetermined in the sequence of a, b, c and d as indicated by the long arrow in FIG. 12A, the position corresponding to the portion b is selected as the third remark point C.

Thereafter, since the tracking direction from the second remark point B to the third remark point C is still leftward, the mask of FIG. 12A is used and moved until the hatched mask portion coincides with the third remark point C as shown in FIG. 13D. In this condition, the position at which the differentiated value is not smaller than the predetermined value is selected as the fourth remark point. In the example shown, since only the position at the mask portion d exhibits the differentiated value not smaller than the predetermined value, the position is selected as the fourth remark point D.

When the fifth remark point E is then selected, since the tracking direction from the third remark point C to the fourth remark point D is downward, the mask of FIG. 12B is used and moved until the hatched mask portion coincides with the fourth remark point D. Thus in the condition shown in FIG. 14E, the position at which the differentiated value is not smaller than the predetermined value is found as the fifth remark point. In the case shown, since only the position at the portion b exhibits the differentiated value not smaller than the predetermined value, the position is selected as the fifth remark point E.

Figure 14E:
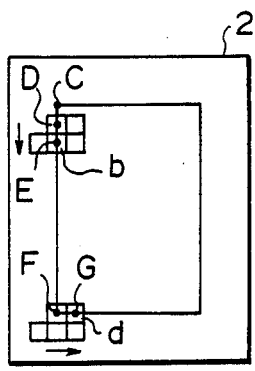
Figure 14F:
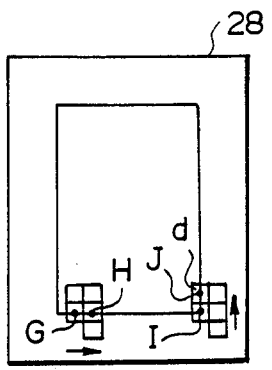

New remark points are then found sequentially in the same manner. When the position at the left lower corner is found as a new remark point F, the mask is positioned as shown in FIG. 14E, and the next remark point is found. In this case, since only the position at the mask portion d exhibits the differentiated value not smaller than the predetermined value, the position is selected as the next remark point G. When the next remark point is found, since the tracking direction becomes rightward, the mask of FIG. 12C is used and positioned so that the hatched mask portion coincides with the remark point G as shown in FIG. 14F. The next remark point is selected in the manner as described above.

Figure 14G:
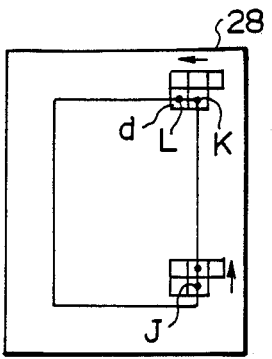

Thereafter, remark point detection is continued by using the mask of FIG. 12C. When the position at the right lower corner is found as a new remark point I as shown in FIG. 14F, since the next remark point J is at the mask portion d, the tracking direction becomes upward, and tracking is continued by use of the mask of FIG. 12D. When the position at the right upper corner is found as a new remark point K as shown in FIG. 14G, since the next remark point L is at the mask portion d, the tracking direction becomes leftward, and tracking is continued by use of the mask of FIG. 12A as shown in FIG. 14H.

Figure 14H:
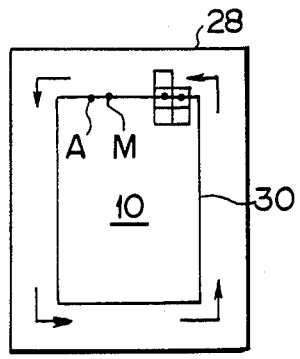

When the position adjacent the first remark point A is found as a new n'th remark point M as shown in FIG. 14H, the inside of the closed curve 30 passing through the first remark point A to the n'th remark point M is regarded as the radiation exposure field 10.

In this embodiment, the tracking direction may be maintained the same and the mask may not be changed when the next remark point appears at portion a, b or c, and the mask may be changed only when the next remark point appears at the portion d. This also applies to the case of the mask shown in FIG. 11.

Figure 14I:
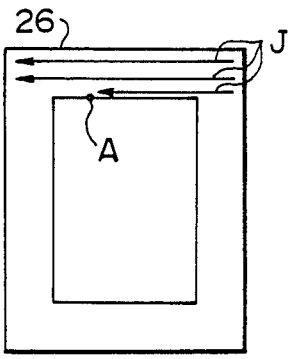

Also, when the masks of FIGS. 12A to 12D are used, the scanning direction for finding the first remark point A as indicated by the arrows J may be selected as the tracking direction as shown in FIG. 14I, and the mask for the selected direction may be used initially.

In the present invention, the radiation exposure field may also be detected by creating the differentiated image constituted by the differentiated values at the respective positions, preparing a plurality of multi-valued image templates each having a portion corresponding to the exposure field contour and provided with values different between positions within said portion corresponding to the exposure field contour and positions within the other portions wherein the shape and the size of said portion corresponding to the exposure field contour are different between said templates in accordance with the shape and the size of exposure field contour in the limitation of the radiation exposure field effected in actual image recording, calculating the correlations between the differentiated values on said differentiated image or values obtained by processing the differentiated values and the values on the respective templates, and recognizing the inside of the exposure field contour corresponding portion of the template exhibiting the maximum correlation as the radiation exposure field. Such an embodiment will hereinbelow be described with reference to FIGS. 15 to 18.

FIG. 15 is an enlarged view of the left upper corner portion of the stimulable phosphor sheet 1 of FIG. 1 and shows the digital image signals f(1,1), f(1,2), ... at picture elements (1,1), (1,2), .... In this embodiment, the positions on the stimulable phosphor sheet are set in the picture element unit.

In this embodiment, as shown in FIGS. 16A, 16B and 16C, the digital image signals are subjected to the two-dimensional first order differentiation processing. First, the digital image signals are subjected to the one-dimensional first order differentiation in the x axis direction to obtain differentiated values $\delta'$ at respective positions, which are equivalent to image signal differences between adjacent positions in the x axis direction and are expressed by $$\delta'(1,1) = f(1,1) - f(1,2)$$
$$\delta'(1,2) = f(1,2) - f(1,3)$$
$$\vdots$$
$$\delta'(2,1) = f(2,1) - f(2,2)$$
$$\delta'(2,2) = f(2,2) - f(2,3)$$
$$\vdots$$

Then, the one-dimensional first order differentiation is conducted in the y axis direction to obtain differentiated values $\delta''$ at respective positions, which are expressed by $$\delta''(1,1) = f(1,1) - f(2,1)$$
$$\delta''(1,2) = f(1,2) - f(2,2)$$
$$\vdots$$
$$\delta''(2,1) = f(2,1) - f(3,1)$$
$$\delta''(2,2) = f(2,2) - f(3,2)$$
$$\vdots$$

Two-dimensional first order differentiated values $\delta$ at respective positions are then calculated on the basis of the differentiated values $\delta'$ and $\delta''$, for example, by adding the absolute values thereof.

$$\delta(1,1) = |\delta'(1,1)| + |\delta''(1,1)|$$
$$\delta(1,2) = |\delta'(1,2)| + |\delta''(1,2)|$$
$$\vdots$$
$$\delta(2,1) = |\delta'(2,1)| + |\delta''(2,1)|$$
$$\delta(2,2) + |\delta'(2,2)| + |\delta''(2,2)|$$
$$\vdots$$

Thereafter, a differentiated image constituted by the differentiated values $\delta$ at respective positions is created. In this embodiment, the differentiated values $\delta$ are always positive. However, since the differentiated values may become negative in accordance with the positions on the stimulable phosphor sheet, for example, when the differentiated image is created by one-dimensional first order differentiation processing, the absolute values thereof are handled as the differentiated values on the differentiated image. Though the differentiated image is created by directly using the differentiated values $\delta$ in this embodiment, it is also possible to create the differentiated image by converting the differentiated values $\delta$ into the two-valued system by use of a predetermined threshold value.

After the differentiated image is created as described above, correlations between the differentiated image and a plurality of multi-valued image templates prepared in advance are calculated, and the radiation exposure field is detected on the basis of the correlations.

FIGS. 17A to 17G show examples of a plurality of the multi-valued image templates prepared in advance. Each template 42 has an exposure field contour corresponding portion 44 hatched in the drawing. Respective positions within the exposure field contour corresponding portion 44 are provided with values, for example, not smaller than 1, the respective positions within the other portions 46 are provided, for example, with a value 0. The shape and the size of the exposure field contour corresponding portion 44 are different between the templates 42 in accordance with the shape and the size of the exposure field contour in the exposure field limitation effected in actual image recording.

The size of the template 42 should preferably be equal to that of the stimulable phosphor sheet 1 shown in FIG. 1 (or the differentiated image. The exposure field contour corresponding portion 44 has a predetermined width t which may correspond to the total width of two or three positions as shown in FIGS. 18 and 19, and may correspond to the width of one position or the total width of four or more positions. By "shape of exposure field contour corresponding portion" is meant the rectangular shape as shown in FIGS. 17A and 17B, the circular shape as shown in FIGS. 17C and 17D, or the like. By "size of exposure field contour corresponding portion" is meant the length of one side of the rectangle, the diameter of the circle, or the like. The templates 42 shown in FIGS. 17E and 17F have the exposure field contour corresponding portion 44 for the case where the radiation exposure field is limited obliquely, and that shown in FIG. 17G has the exposure field contour corresponding portion 44 for the case where the radiation exposure field is limited in the circular form and the subdivision image recording is conducted. The respective positions on the template 42 correspond to the respective positions on the differentiated image. However, they need not necessarily correspond in one-to-one relation and, for example, one position on the template 42 may correspond to 2×2 positions adjacent to each other on the differentiated image. As shown in FIG. 18, the respective positions within the exposure field contour corresponding portion 44 may be provided with the same value, i.e. a value 1. Or, as shown in FIG. 19, they may be provided with two values, i.e. 2 at the center and 1 on two sides. Of course, they may be provided with three or more values, and the values may be assigned in any manner.

Then, the correlations between the differentiated image and the template images are calculated. That is, similarity between the images is digitized by calculating as described below. Thereafter, the inside of the exposure field contour corresponding portion of the template image exhibiting the maximum correlation is recognized as the radiation exposure field.

Specifically, in this embodiment, the differentiated values (i.e. the differentiated values themselves or the values obtained by converting the differentiated values into the two-valued system) at the respective positions on the differentiated image are multiplied by the values at the corresponding positions on each template, and the total of the products is calculated. When the positions on the differentiated image and those on the template correspond in one-to-one relation, values at the corresponding positions are multiplied. When four positions on the differentiated image correspond to one position on the template, the respective differentiated values at the four positions are multiplied by the value at the single position on the template. After multiplication between the corresponding positions is carried out over the whole area of the template, the products are added.

Addition of the products is conducted for the respective templates, and the inside of the exposure field contour corresponding portion of the template exhibiting the maximum sum of products is regarded as the radiation exposure field.

Since the differentiated values at positions where the exposure field contour is present are larger than those at the other positions as described above, the sum of the products in the case of the template having the exposure field contour corresponding portion 44 which just coincides with the exposure field contour becomes larger than that in the cases of the other templates. Therefore, when many templates having various exposure field contour corresponding portions in accordance with the shapes and sizes of expected exposure field contours are prepared and the template exhibiting the maximum product sum is selected by conducting the multiplication between the differentiated image and the respective templates as described above and adding the products, it may be regarded that the actual exposure field contour is present within the exposure field contour corresponding portion 44 of the selected template. Thus it is possible to recognize that the inside of the exposure field contour corresponding portion 44 as the radiation exposure field. When the portion 44 has some width, the inside of any position within the portion 44, for example, the inside of the inner edge, the outer edge or the center of the width portion, may be recognized as the radiation exposure field.

In another embodiment of the read-out condition adjusting method, digital image signals at respective positions on the stimulable phosphor sheet or a sheet portion having one radiation exposure field are detected on the basis of the image information obtained by the preliminary read-out, the respective positions forming in line in a predetermined direction on said stimulable phosphor sheet or said sheet portion are set as a line, said digital image signals on said line are subjected to the differentiation processing, two positions at which the absolute values of the differentiated values exceed a predetermined value To are selected as prospective exposure field contour points on said line, the minimum value T1 of said digital image signals on said line between said prospective exposure field contour points is detected, two outer positions at which said digital image signals are equal to said minimum value T1 on said line are detected as exposure field contour points on said line, said detection of said exposure field contour points is conducted for respective lines within a predetermined range on said stimulable phosphor sheet or said sheet portion, and the inside of a contour line or lines passing through said exposure field contour points on the respective lines is recognized as the radiation exposure field. Such an embodiment will hereinbelow be described with reference to FIGS. 20 to 25B.

Figure 20:
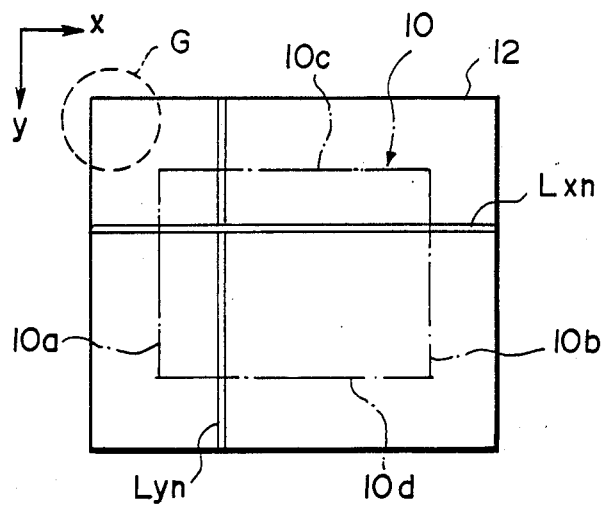
FIG. 20 is a schematic view showing the stimulable phosphor sheet and the radiation exposure field in another embodiment of the read-out condition adjusting method in accordance with the present invention, FIGS. 21A, 21B and 21C respectively are an enlarged view showing the portion G of FIG. 20, a schematic view showing the digital image signals at respective positions at the portion G, and a schematic view showing the differentiated values at the respective positions.

FIG. 20 shows a stimulable phosphor sheet 12 having one radiation exposure field 10, and FIG. 21A is an enlarged view of the portion G of the sheet 12 shown in FIG. 20. In this embodiment, the respective positions on the sheet 12 are set in the picture element unit.

After digital image signals $f(1,1)$, $f(2,1)$, . . . at picture elements or positions $(1,1)$, $(2,1)$, . . . are detected, the respective positions forming in line in a predetermined direction on the sheet 12 are set as one line. The line setting may be effected in only one direction or in two directions. Of course, it may also be effected in more directions.

In this embodiment, lines are set in the x axis and y axis directions normal to each other. Specifically, positions $(1,1)$, $(2,1)$, $(3,1)$, $(4,1)$, $(5,1)$, . . . forming in line in the x axis direction are set as the first x axis line Lx1, and positions $(1,2)$, $(2,2)$, $(3,2)$, $(4,2)$, $(5,2)$, . . . forming in line are set as the second x axis line Lx2. The third x axis line Lxa, the fourth x axis line Lx4, . . . are set in the same manner. Also, positions $(1,1)$, $(1,2)$, $(1,3)$, $(1,4)$, . . . forming in line in the y axis direction are set as the first y axis line Ly1, and positions $(2,1)$, $(2,2)$, $(2,3)$, $(2,4)$, . . . are set as the second y axis line Ly2. The third y axis line Ly3, the fourth y axis line Ly4, . . . are set in the same manner.

Then, the digital image signals on each line are subjected to the differentiation processing to detect exposure field contour points on the line as described below by taking the n'th x axis line Lxn shown in FIG. 20 as an example.

Figure 22:
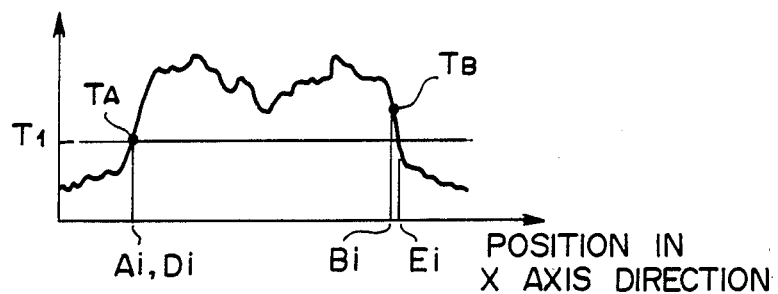
FIG. 22 is a graph showing the digital image signals on line Lxn of FIG. 20.
Figure 23:
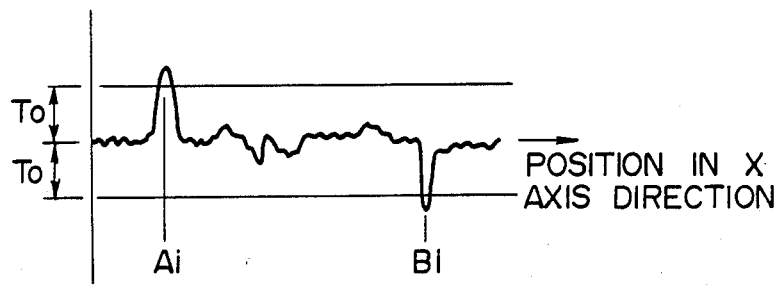
FIG. 23 is a graph showing the differentiated values of the digital image signals on line Lxn.

FIG. 22 shows the levels of the digital image signals at the respective positions on the line Lxn, and FIG. 23 shows the differentiated values obtained at the respective positions by the differentiation processing of the digital image signals on the line Lxn.

First, differentiated values $\delta$ at the respective positions on the line Lxn are obtained as shown below by conducting the first order differentiation of the digital image signals on the line Lxn.

$$\delta(1,n) = f(1,n) - f(2,n)$$

$$\delta(2,n) = f(2,n) - f(3,n)$$

Then, as shown in FIG. 23, positions Ai and Bi at which the absolute values of the differentiated values are not smaller than a predetermined value To are selected as prospective exposure field contour points on the line Lxn. Since the exposure field contour line is generally a closed curve, one line intersects with the closed contour curve at two points, and therefore two contour points are present on one line. As a result, two prospective contour points are detected.

As shown in FIG. 22, the minimum value T1 of the digital image signals on the line Lxn between the prospective exposure field contour points Ai and Bi is then detected. In this embodiment, an image signal TA at the prospective exposure field contour point Ai is the minimum digital image signal between the prospective exposure field contour points Ai and Bi. However, in some cases, as shown in FIG. 24, an image signal TC at a position Ci between the positions Ai and Bi may become the minimum value T1.

After the minimum value T1 is detected, two outer positions at which the digital image signals are equal to the minimum value T1 on the line Lxn are detected as exposure field contour points Di and Ei on the line Lxn. Stated differently, the positions between Di and Ei at which the digital image signals are not smaller than the minimum value T1 are judged as the exposure field region on the line Lxn.

In this embodiment, since the digital image signal TA at the prospective exposure field contour points Ai is equal to the minimum value T1, there are only two positions (Di and Ei) at which the digital image signals are equal to the minimum value T1, and the positions Di and Ei are automatically detected as the two outer positions. However, when the digital image signal TC at the position Ci between Ai and Bi is equal to the minimum value T1 as shown in FIG. 24, three positions (Di, Ci and Ei) are detected as the positions at which the image signals are equal to the minimum value T1. In this case, the outer positions Di and Ei outside of Ci are detected as the exposure field contour points.

When the exposure field contour points Di and Ei are detected with reference to the minimum image signal T1 between the prospective exposure field contour points Ai and Bi, it becomes possible to detect a relatively wide radiation exposure field and to eliminate the risk of the detected exposure field becoming narrower than the actual exposure field.

Detection of the exposure field contour points on one line as described above is conducted for respective x axis lines Lx over the whole area in the y axis direction, and contour lines 10a and 10b in the y axis direction shown in FIG. 20 are detected by connecting the exposure field contour points on the respective lines Lx.

In the same manner, exposure field contour points on an arbitrary y axis line Lyn are detected, and detection of the contour points is conducted for the respective y axis lines Ly over the whole area in the x axis direction. Contour lines 10c and 10d in the x axis direction are detected by connecting the contour points on the respective lines Ly. The inside of the contour lines 10a, 10b, 10c and 10d, i.e. the region surrounded thereby, is recognized as the radiation exposure field.

In the aforesaid embodiment, detection of the contour points is carried out for the lines over the whole region on the sheet 12. However, it may be conducted only for lines within a predetermined region on the sheet 12. For example, when the region of the radiation exposure field is approximately known, the contour point detection may be conducted only for the lines within the region. Or, the contour point detection may first be conducted for the x axis lines Lx to detect the contour lines 10a and 10b in the y axis direction, and then be conducted only for the y axis lines Ly between the contour lines 10a and 10b.

In the aforesaid embodiment, contour point detection need not necessarily be conducted for lines in two directions. For example, when the radiation exposure field has a circular shape or an inclined rectangular shape as shown in FIGS. 25A and 25B, the whole exposure field contour may be detected by conducting the contour point detection only for the lines Lx in the x axis direction.

Also, exposure field detection may be conducted by setting the positions as described below. First, as shown in FIG. 21B, sets of three picture elements adjacent in the y axis direction in FIG. 21A may be set as respective positions as expressed by Position $(1,2)' = $ picture elements $(1,1) + (1,2) + (1,3)$ Position $(2,2)' = $ picture elements $(2,1) + (2,2) + (2,3)$

.
.

Position $(1,5)' = $ picture elements $(1,4) + (1,5) + (1,6)$

Position $(2,5)' = $ picture elements $(2,4) + (2,5) + (2,6)$

.
.

Digital image signals F at respective positions are calculated by $$F(1,2)' = (f(1,1) + f(1,2) + f(1,3))/3$$

$$F(2,2)' = (f(2,1) + f(2,2) + f(2,3))/3$$

.
.

$$F(1,5)' = (f(1,4) + f(1,5) + f(1,6))/3$$

$$F(2,5)' = (f(2,4) + f(2,5) + f(2,6))/3$$

.
.

The image signals F are subjected to the differentiation processing for each line in the x axis direction to obtain differentiated values $\delta$ at the respective positions, and the exposure field contour line in the y axis direction is detected by using the differentiated values $\delta$ in the same manner as described above. Then, sets of three picture elements adjacent in the x axis direction are set as respective positions as expressed by Position $(2,1)' = $ picture elements $(1,1) + (2,1) + (3,1)$ Position $(2,2)' = $ picture elements $(1,2) + (2,2) + (3,2)$

.
.

Position $(5,1)' = $ picture elements $(4,1) + (5,1) + (6,1)$

Position $(5,2)' = $ picture elements $(4,2) + (5,2) + (6,2)$

.
.

-continued

Digital image signals F at the respective positions are calculated by arithmetic averaging as described above, and are differentiated for each line in the y axis direction to obtain differentiated values δ, which are then used to detect the exposure field contour line in the x axis direction in the same manner as described above.

In a further embodiment of the read-out condition adjusting method, the respective positions forming in line in a predetermined direction on said stimulable phosphor sheet are set as a line, said digital image signals on said line are subjected to the differentiation processing, at least one position at which the absolute value of the differentiated value exceeds a predetermined value To is selected as an exposure field contour point on said line, and when there is an undetected latent contour point among a plurality of the exposure field contour points actually present on said line, the digital image signal at said position at which the absolute value of the differentiated value exceeds the predetermined value To on said line is detected, a characteristic value Th of said digital image signal is determined from said digital image signal, a position outside of said position at which the absolute value of the differentiated value exceeds the predetermined value To or outside of a position in the vicinity of said position among those at which the digital image signals are equal to said characteristic value Th on said line is recognized as said latent contour point, said detection of said exposure field contour points is conducted for respective lines within a predetermined range on said stimulable phosphor sheet, and the inside of a contour line or lines passing through said exposure field contour points on the respective lines is recognized as the radiation exposure field. Such an embodiment will hereinbelow be described with reference to FIGS. 26, 27 and 28.

Figure 26:
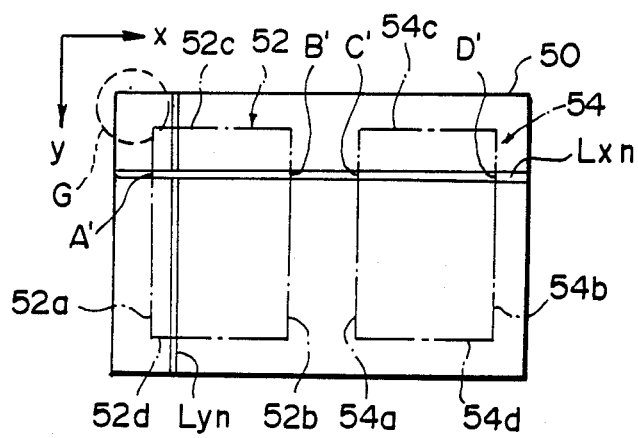
FIG. 26 is a schematic view showing the stimulable phosphor sheet and the radiation exposure field in a further embodiment of the read-out condition adjusting method in accordance with the present invention.

In FIG. 26, a stimulable phosphor sheet 50 is divided into two sections, and a radiation image is recorded in each section by limiting the radiation exposure field.

In this embodiment, respective positions on the stimulable phosphor sheet are set in the picture element unit as shown in FIG. 21A, and the lines Lxn and Lyn are set in the same manner as described with reference to FIG. 20. After the lines are set, exposure field contour points are detected by conducting the differentiation processing and a threshold value processing using a predetermined value To for each line as described below.

Figure 27:
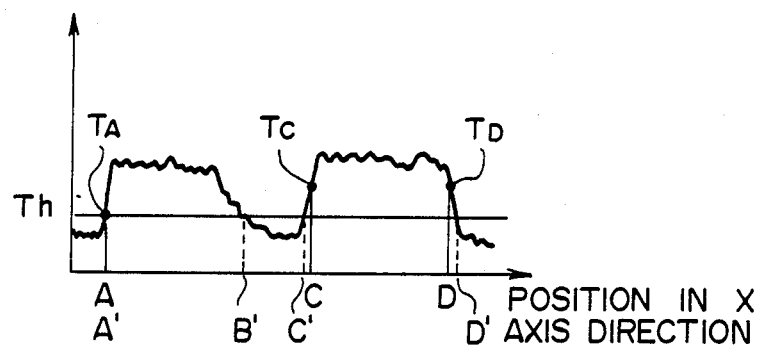
FIG. 27 is a graph showing the digital image signals on line Lxn of FIG. 26.
Figure 28:
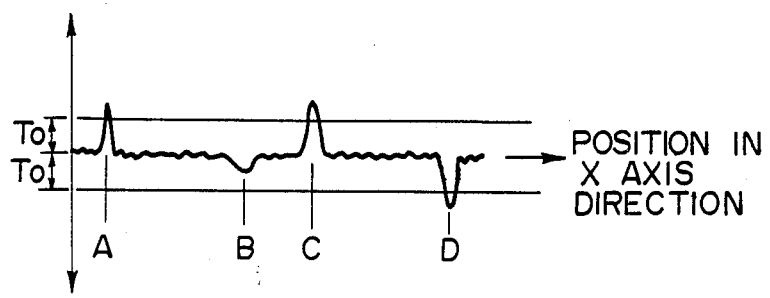
FIG. 28 is a graph showing the differentiated values of the digital image signals on line Lxn of FIG. 26.

FIG. 27 shows the levels of the digital image signals at the respective positions on the line Lxn, and FIG. 28 shows the differentiated values obtained at the respective positions by the differentiation processing of the digital image signals on the line Lxn.

The differentiated values at the respective positions on the line Lxn are calculated in the same manner as described with reference to FIG. 23, and then positions A, C and D at which absolute values of the differentiated values exceeds the predetermined value To are detected as the exposure field contour points on the line Lxn.

However, the absolute values of the differentiated values do not always exceed the predetermined value To. Specifically, though a right contour line 52b of a right exposure field 52 is present, the change in the image signals at the right contour line 52b may be small as shown in FIG. 27, and the absolute value of the differentiated value at the position B of the right contour line 52b may not exceed the predetermined value To as shown in FIG. 28.

In this case, as shown in FIG. 27, digital image signals TA, TC and TD on the line Lxn at the contour points A, C and D detected by the threshold value processing using the predetermined value To are detected. Then, a characteristic value Th of the digital image signals TA, TC and TD is determined on the basis of these digital image signals.

The characteristic value Th may be any value insofar as it is based on the image signals TA, TC and TD, and may be the minimum value, average value, median value or maximum value of TA, TC and TD. In this embodiment, TA which is the minimum value between the three values is adopted as the characteristic value Th.

Thereafter, as shown in FIG. 27, positions A', B', C' and D' at which the digital image signals are equal to the characteristic value Th are detected, and the position B' outside of the positions A', C' and D' which are equal to or near the positions A, C and D exhibiting the absolute values of the differentiated values exceeding the predetermined value To is recognized as the latent contour point. This is because the positions A, C and D and the positions A', C' and D' equal to or near the positions A, C and D respectively correspond to the same contour points, and the other position B' corresponds to the latent contour point which could not be detected by the aforesaid differentiation processing and the threshold value processing.

In this manner, all of the four contour points present on the line Lxn can be detected. In this case, though the single position B' is detected as the contour point corresponding to the contour line 52b in the y axis direction since it was the latent contour point, the positions A and A', C and C' and D and D' are respectively detected as the contour points corresponding to the contour lines 52a, 54a and 54b in the y axis direction. Any of the positions A and A', C and C', and D and D' may be respectively employed as the contour points corresponding to the contour lines 52a, 54a and 54b.

Detection of the all contour points on the x axis line Lxn is conducted for the x axis lines Lx over the whole region in the y axis direction, and the contour lines 52a, 52b, 54a and 54b in the y axis direction are detected by connecting the contour lines on the respective lines Lx.

Also for an arbitrary line Lyn in the y axis direction, all of the contour points on the line are detected in the same manner. As shown in FIG. 26, there are two contour points on the line Lyn. When one of the contour points is not detected by the differentiation processing and the threshold value processing, the latent contour point is detected in the same manner as described above. In this case, since only one contour point is detected by the differentiation processing and the threshold value processing, the characteristic value Th is determined from the digital image signal at the single contour point. For example, the digital image signal itself may be selected as the characteristic value Th. The contour point detection is conducted for respective y axis lines Ly over the whole region in the x axis direction. The contour points on the lines Ly are connected to determine the contour lines 52c, 52d, 54c and 54d in the x axis direction. The inside of the contour lines 52c, 52d, 54c and 54d and the contour lines 52a, 52b, 54a and 54b, i.e. the region surrounded by these contour lines, is recognized as the radiation exposure field.

In a still further embodiment of the read-out condition adjusting method, the respective positions forming in line in a predetermined direction on said stimulable phosphor sheet are set as a line, said digital image signals on said line are subjected to the differentiation processing, at least one position at which the absolute value of the differentiated value exceeds a predetermined value To is selected as a prospective exposure field contour point on said line, the digital image signal at said prospective exposure field contour point on said line is detected, a characteristic value Th of said digital image signal is determined from said digital image signal, positions at which the digital image signals are equal to said characteristic value Th on said line are detected as the exposure field contour points on said line, said detection of said exposure field contour points is conducted for respective lines within a predetermined range on said stimulable phosphor sheet, and the inside of a contour line or lines passing through said exposure field contour points on the respective lines is recognized as the radiation exposure field.

This embodiment is similar to that described with reference to FIGS. 26, 27 and 28, except that the positions A, C and D at which the absolute values of the differentiated values exceed the predetermined value To as shown in FIG. 28 are selected as prospective exposure field contour points, and the positions A', B', C' and D' at which the digital image signals are equal to the characteristic value Th as shown in FIG. 27 are detected as the exposure field contour points on the line Lxn. Stated differently, the positions (A' to B', C' to D')at which the digital image signals are not smaller than the characteristic value Th are judged as the exposure field contour region on the line Lxn.

The embodiment mentioned last is applicable not only to the case where the contour line 52b cannot be detected by the differentiation processing and the threshold value processing but also to the case where all of the contour lines can be detected thereby. In the method of detecting the contour line positions by the differentiation processing and the threshold value processing, it is necessary to to judge whether all of the contour line positions could be detected or not. When there is an undetected contour line, some processing must be conducted for detecting the contour line. Thus the algorithm up to the final exposure field detection becomes complicated. However, in the embodiment mentioned last, all of the contour line positions can be detected automatically regardless of whether they could be detected by the initial differentiation processing and the threshold value processing or not, and the algorithm becomes simple.

We claim:

1. A method of adjusting radiation image read-out conditions in which preliminary read-out conducted by exposing a stimulable phosphor sheet carrying a radiation image of an object stored therein by limitation of a radiation exposure field to stimulating rays of a level lower than the level of stimulating rays used in final read-out and detecting the radiation image stored in the stimulable phosphor sheet is carried out prior to the final read-out wherein the stimulable phosphor sheet is exposed to stimulating rays which cause the stimulable phosphor sheet to emit light in proportion to the stored radiation energy and the emitted light is photoelectrically detected to obtain electric image signals used for reproducing a visible image, and read-out conditions in the final read-out are adjusted on the basis of the image information obtained by the preliminary read-out,
wherein the improvement comprises detecting digital image signals at respective positions on said stimulable phosphor sheet on the basis of the image information obtained by said preliminary read-out, subjecting said digital image signals to a differentiation processing, defining a radiation exposure field on said stimulable phosphor sheet by use of the differentiated values obtained thereby, and on the basis of the image information obtained within said radiation exposure field, adjusting the read-out conditions in said final read-out using the image information obtained by said preliminary read-out.

2. A method of detecting, in an image read-out process, a radiation exposure field of a stimulable phosphor sheet carrying a radiation image which is photoelectrically read out to obtain image information in the form of digital image signals, the method comprising the steps of:
detecting digital image signals at respective positions on said stimulable phosphor sheet on the basis of the image information obtained by said photoelectric read-out, subjecting said digital image signals to a differentiation processing, and defining a radiation exposure field on said stimulable phosphor sheet by use of the differentiated values obtained thereby.

3. A method as defined in claim 2 wherein, when said exposure field is rectangular, detection of said exposure field effected by use of said differentiated values is conducted by selecting x and y axes along two adjacent sides of the rectangle, calculating the differentiated values in the x axis direction, adding said differentiated values in the y axis direction to judge the position of the exposure field contour on the x axis, calculating the differentiated values in the y axis direction, and adding said differentiated values in the x axis direction to judge the position of said exposure field contour on the y axis.

4. A method of detecting an exposure field of an image in an image read-out process in which the image is photoelectrically read out to obtain image information in the form of digital image signals comprising the steps of detecting digital image signals at respective positions on said image on the basis of the image information obtained by said photoelectric read-out, subjecting said digital image signals to a differentiation processing, and detecting an exposure field on said image by use of the differentiated values obtained thereby, wherein said exposure field is detected by, in a differentiated image constituted by said differentiated values obtained by said differentiation processing, selecting an arbitrary position at which the differentiated value is the maximum or not smaller than a predetermined value as a first remark point, finding a position at which the differentiated value is the maximum among the positions adjacent said first remark point and selecting said position as a second remark point, finding a position at which the differentiated value is the maximum among the positions adjacent said second remark point and outside of the previous remark point and selecting said position as a third remark point, thereafter repeating the step of finding said third remark point to find new remark points sequentially until a position adjacent said first remark point is found as a new remark point, and recognizing the inside of the closed curve passing through the found remark points as said exposure field.

5. A method of detecting an exposure field of an image in an image read-out process in which the image is photoelectrically read out to obtain image information in the form of digital image signals comprising the steps of detecting digital image signals at respective positions on said image on the basis of the image information obtained by said photoelectric read-out, subjecting said digital image signals to a differentiation processing, and detecting an exposure field on said image by use of the differentiated values obtained thereby, wherein said exposure field is detected by, in a differentiated image constituted by said differentiated values obtained by said differentiation processing, selecting an arbitrary position at which the differentiated value is the maximum or not smaller than a predetermined value as a first remark point, finding a position at which the differentiated value is not smaller than the predetermined value among the positions adjacent said first remark point and selecting said position as a second remark point, finding a position at which the differentiated value is not smaller than the predetermined value among the positions adjacent said second remark point and outside of the previous remark point and selecting said position as a third remark point, thereafter repeating the step of finding said third remark point to find new remark points sequentially until a position adjacent said first remark point is found as a new remark point, and recognizing the inside of the closed curve passing through the found remark points as said exposure field.

6. A method as defined in claim 5 wherein, when a plurality of positions at which the differentiated values are not smaller than the predetermined value are present among said adjacent positions at the stage of finding said second and subsequent new remark points, a priority sequence is determined in advance for said adjacent positions, and the next new remark point is selected in accordance with said priority sequence from the plurality of said positions at which the differentiated values are not smaller than the predetermined value.

7. A method as defined in claim 5 wherein, when no position at which the differentiated value is not smaller than the predetermined value is present among said adjacent positions at the stage of finding said second and subsequent new remark points, and the position exhibiting the maximum differentiated value among said adjacent positions is selected as the next new remark point.

8. A method of detecting an exposure field of an image in an image read-out process in which the image is photoelectrically read out to obtain image information in the form of digital image signals comprising the steps of detecting digital image signals at respective positions on said image on the basis of the image information obtained by said photoelectric read-out, subjecting said digital image signals to a differentiation processing, and detecting an exposure field on said image by use of the differentiated values obtained thereby, wherein said exposure field is detected by creating a differentiated image constituted by said differentiated values at the respective positions, preparing a plurality of multi-valued image templates each having a portion corresponding to the exposure field contour and provided with values different between positions within said portion corresponding to the exposure field contour and positions within the other portions wherein the shape and the size of said portion corresponding to the exposure field contour are different between said templates in accordance with the shape and the size of exposure field contour in the limitation of said exposure field effected in actual image recording, calculating the correlations between said differentiated values on said differentiated image or values obtained by processing said differentiated values and the values on the respective templates, and recognizing the inside of the exposure field contour corresponding portion of the template exhibiting the maximum correlation as said exposure field.

9. A method of detecting an exposure field of an image in an image read-out process in which the image is photoelectrically read out to obtain image information in the form of digital image signals comprising the steps of detecting digital image signals at respective positions on said image on the basis of the image information obtained by said photoelectric read-out, subjecting said digital image signals to a differentiation processing, and detecting an exposure field on said image by use of the differentiated values obtained thereby, wherein digital image signals at respective positions on the image or an image portion having one exposure field are detected on the basis of the image information obtained by the photoelectric read-out, the respective positions forming in line in a predetermined direction on said image or said image portion are set as a line, said digital image signals on said line are subjected to the differentiation processing, two positions at which the absolute values of the differentiated values exceed a predetermined value $T_o$ are selected as prospective exposure field contour points on said line, the minimum value $T_1$ of said digital image signals on said line between said prospective exposure field contour points is detected, two outer positions at which said digital image signals are equal to said minimum value $T_1$ on said line are detected as exposure field contour points on said line, said detection of said exposure field contour points is conducted for respective lines within a predetermined range on said image or said image portion, and the inside of a contour line or lines passing through said exposure field contour points on the respective lines is recognized as said exposure field.

10. A method as defined in claim 7 wherein x and y axes normal to each other are set on said image or said image portion, and said detection of said exposure field contour points on said line is conducted for the lines in the x axis direction and the lines in the y axis direction.

11. A method of detecting an exposure field of an image in an image read-out process in which the image is photoelectrically read out to obtain image information in the form of digital image signals comprising the steps of detecting digital image signals at respective positions on said image on the basis of the image information obtained by said photoelectric read-out, subjecting said digital image signals to a differentiation processing, and detecting an exposure field on said image by use of the differentiated values obtained thereby, wherein the respective positions forming in line in a predetermined direction on said image are set as a line, said digital image signals on said line are subjected to the differentiation processing, at least one position at which the absolute value of the differentiated value exceeds a predetermined value $T_o$ is selected as an exposure field contour point on said line, and when there is an undetected latent contour point among a plurality of the exposure field contour points actually present on said line, the digital image signal at said position at which the absolute value of the differentiated value exceeds the predetermined value $T_o$ on said line is detected, a characteristic value $T_h$ of said digital image signal is determined from said digital image signal, a position outside of said position at which the absolute value of the differentiated value exceeds the predetermined value To or outside of a position in the vicinity of said position among those at which the digital image signals are equal to said characteristic value Th on said line is recognized as said latent contour point, said detection of said exposure field contour points is conducted for respective lines within a predetermined range on said image, and the inside of a contour line or lines passing through said exposure field contour points on the respective lines is recognized as the exposure field.

12. A method as defined in claim 11 wherein x and y axes normal to each other are set on said image or said image portion, and said detection of said exposure field contour points on said line is conducted for the lines in the x axis direction and the lines in the y axis direction.

13. A method of detecting an exposure field of an image in an image read-out process in which the image is photoelectrically read out to obtain image information in the form of digital image signals comprising the steps of detecting digital image signals at respective positions on said image on the basis of the image information obtained by said photoelectric read-out, subjecting said digital image signals to a differentiation processing, and detecting an exposure field on said image by use of the differentiated values obtained thereby, wherein the respective positions forming in line in a predetermined direction on said image are set as a line, said digital image signals on said line are subjected to the differentiation processing, at least one position at which the absolute value of the differentiated value exceeds a predetermined value To is selected as a prospective exposure field contour point on said line, the digital image signal at said prospective exposure value Th of said digital image signal is determined from said digital image signal, positions at which the digital image signals are equal to said characteristic value Th on said line are detected as the exposure field contour points on said line, said detection of said exposure field contour points is conducted for respective lines within a predetermined range on said image, and the inside of a contour line or lines passing through said exposure field contour points on the respective lines is recognized as the exposure field.

14. A method as defined in claim 13 wherein x and y axes normal to each other are set on said image or said image portion, and said detection of said exposure field contour points on said line is conducted for the lines in the x axis direction and the lines in the y axis direction.

* * * * *